US011577741B1

(12) United States Patent
Reschka et al.

(10) Patent No.: US 11,577,741 B1
(45) Date of Patent: Feb. 14, 2023

(54) SYSTEMS AND METHODS FOR TESTING COLLISION AVOIDANCE SYSTEMS

(71) Applicant: Zoox, Inc., Foster City, CA (US)

(72) Inventors: Andreas Christian Reschka, Foster City, CA (US); Collin MacGregor, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 503 days.

(21) Appl. No.: 16/376,750

(22) Filed: Apr. 5, 2019

(51) Int. Cl.
*B60W 30/095* (2012.01)
*B60W 50/04* (2006.01)
*B60W 50/00* (2006.01)

(52) U.S. Cl.
CPC ...... *B60W 50/045* (2013.01); *B60W 30/0953* (2013.01); *B60W 30/0956* (2013.01); *B60W 2050/0031* (2013.01); *B60W 2050/041* (2013.01)

(58) Field of Classification Search
CPC .......... B60W 50/045; B60W 30/0953; B60W 30/0956; B60W 2050/0031; B60W 2050/041
See application file for complete search history.

(56) References Cited

U.S. PATENT DOCUMENTS

| | | | | |
|---|---|---|---|---|
| 2008/0312834 | A1* | 12/2008 | Noda | B60T 7/22 701/301 |
| 2014/0324330 | A1* | 10/2014 | Minemura | G08G 1/16 701/301 |
| 2017/0213149 | A1* | 7/2017 | Micks | G06K 9/00805 |
| 2018/0178786 | A1* | 6/2018 | Takaki | B60W 30/09 |
| 2019/0071098 | A1* | 3/2019 | Asakura | G06K 9/00798 |
| 2019/0072966 | A1* | 3/2019 | Zhang | G08G 1/166 |
| 2019/0098471 | A1* | 3/2019 | Rech | H04W 4/02 |
| 2019/0129831 | A1* | 5/2019 | Goldberg | G06F 3/04847 |
| 2020/0379461 | A1* | 12/2020 | Singh | G05D 1/0088 |

* cited by examiner

*Primary Examiner* — Christian Chace
*Assistant Examiner* — Jordan S Fei
(74) *Attorney, Agent, or Firm* — Lee & Hayes, P.C.

(57) ABSTRACT

A vehicle may include a primary system for generating data to control the vehicle and a secondary system that validates the data and/or other data to avoid collisions. For example, the primary system may localize the vehicle, detect an object around the vehicle, predict an object trajectory, and generate a trajectory for the vehicle. The secondary system may localize the vehicle, detect an object around the vehicle, predict an object trajectory, and determine a likelihood of a collision of the vehicle with the object. A simulation system may generate simulation scenarios that test aspects of the primary system and the secondary system. Simulation scenarios may include simulated vehicle control data that causes the primary system to generate a driving trajectory and simulated object data that causes the secondary system to determine a collision.

20 Claims, 6 Drawing Sheets

SYSTEMS AND METHODS FOR TESTING COLLISION AVOIDANCE SYSTEMS

BACKGROUND

Safety of passengers in a vehicle, such as an autonomous vehicle, and other people or objects in proximity to the vehicle, is of the utmost importance. Such safety is often predicated on an accurate detection of a potential collision and timely deployment of a safety measure. While autonomous vehicles are often implemented with systems that have highly effective collision detection systems, testing such systems can prove difficult.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
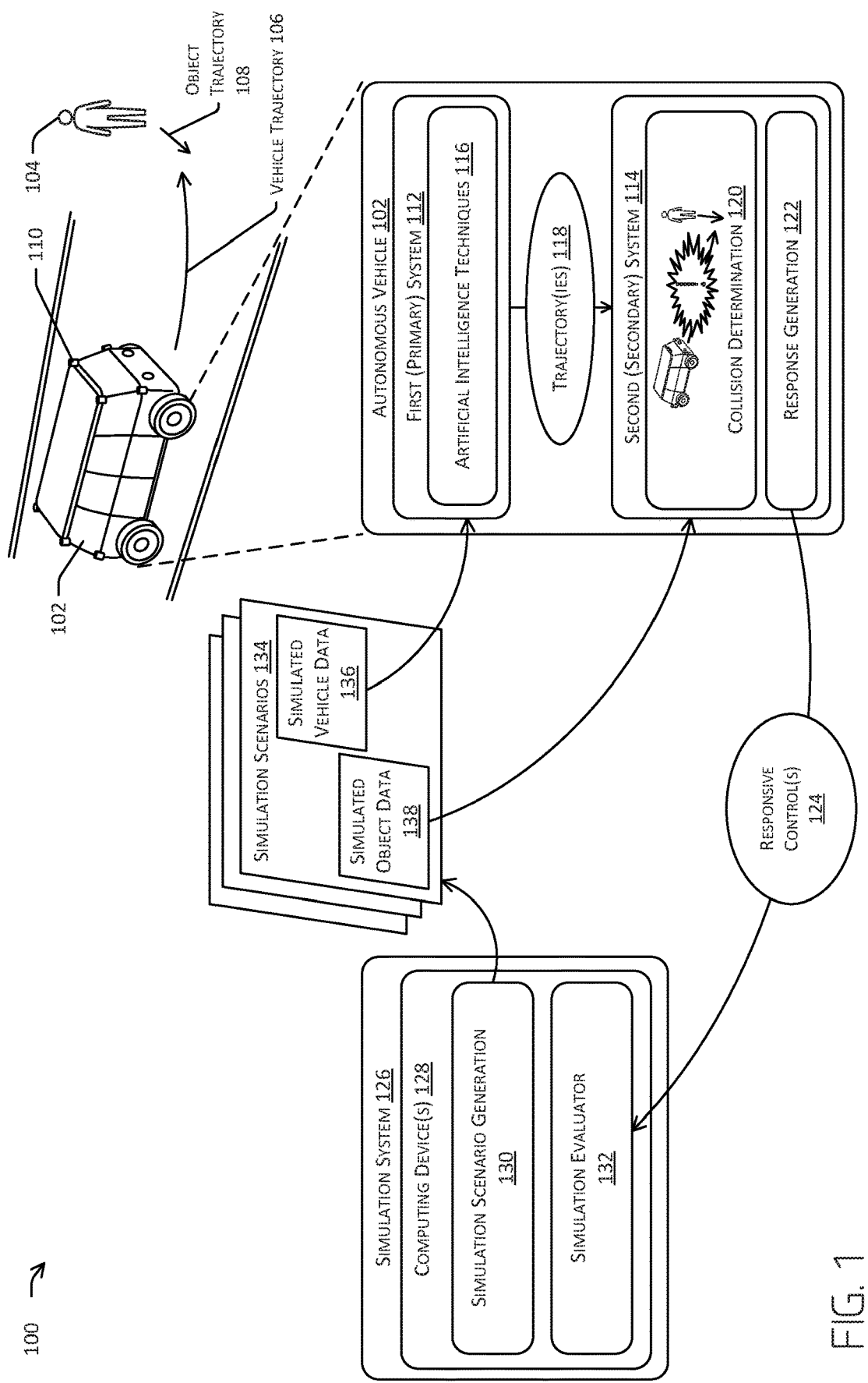
FIG. 1 illustrates an example vehicle, such as an autonomous vehicle, and example components of a system for testing systems of the vehicle, as described herein.

This disclosure describes methods, apparatuses, and systems for testing vehicle systems configured to respond to objects and/or events that can result in a collision. For example, an autonomous vehicle can include a primary system for generating data to control the vehicle and a secondary system to validate such control data and react to potential collisions, e.g., using other data, such as sensor data, to detect and react to an object that may result in a collision (which, in some cases, may not have been adequately detected and/or accounted for in the primary system). For example, the primary system may localize the vehicle, detect one or more objects around the vehicle, segment sensor data, determine a classification of the object(s), predict object trajectories, generate one or more trajectories for the vehicle, transmit the trajectory for execution by the vehicle, and so on. The secondary system may have reduced functionality compared to the primary system, but may independently localize the vehicle, receive sensor data to detect an object around the vehicle, predict an object trajectory, evaluate a trajectory generated by the primary system, and so on using high integrity, and inspectable algorithms. In examples, if the secondary system detects a likely collision of the vehicle with an object, the secondary system may generate commands that cause the vehicle to perform a maneuver, such as decelerating, changing lanes, swerving, etc.

In implementations, the secondary system described above may be a fail-safe or emergency system that can detect and react to objects and events more quickly than the primary system. For instance, the secondary system may cause a revised trajectory or action in response to an unexpected or low-probability event, such as a failure of the primary system to detect and/or accurately determine an object and associated trajectory in an environment. Because the secondary system is intended for low-probability events, the autonomous vehicle may navigate for extended periods of time before an event causes the secondary system to act. Moreover, it is difficult to replicate these events in a controlled testing environment, as, by their nature, such events have an increased likelihood of resulting in a collision (and potential damage). Systems and techniques described herein remedy these deficiencies by generating simulation scenarios designed to test collision avoidance systems (as well as vehicle actuators), such as the secondary system described above.

In some examples, the techniques described herein can be implemented by a simulation system in communication with a vehicle control system, such as the vehicle control system discussed above. For example, the simulation system may provide simulation data to the vehicle control system and receive data from the vehicle control system. In some instances, the simulation data may include simulated sensor data that causes the vehicle control system to perform one or more functions, including generating responses to the sensor data, such as vehicle controls or trajectories. The simulation system may receive information about the responses. Also in examples, the simulation system can evaluate the responses, as described further herein. In other instances, the simulation system may also simulate the vehicle control system, e.g., by accessing software and/or other programming associated with a control system, but in some computing environment removed from a vehicle.

In some examples, the simulation data transmitted to the vehicle control system can include simulated vehicle control data that causes the vehicle control system to generate controls executable by a vehicle associated with the vehicle control system to perform an action or a maneuver. For instance, the simulated vehicle control data may be data of the type that causes a primary system of the vehicle control data to generate one or more vehicle trajectories for navigating through an environment. In examples, the simulated vehicle control data may be based on actual vehicle dynamics. For example, the simulated vehicle control data may be selected to cause a simulated vehicle to perform actions that are within the capabilities of some real vehicle, e.g., within a range of speed, acceleration, turning radius, or the like, of the actual vehicle including the vehicle control system. As will be appreciated, the vehicle control data can vary depending on the attributes and capabilities of the vehicle with which the vehicle control system is to be used and may account for vehicle dynamic, kinematics, various components, actuators, and the like. For instance, the vehicle control data to simulate an autonomous bus may be different from the vehicle control data to simulate a compact autonomous vehicle.

The simulation data can also include simulated object data. For example, the simulated object data may be simulated sensor data that causes the vehicle control system to perceive an object in a simulated environment. The simulated object data may be based on object dynamics. For example, the simulated object data may be based on models of object behavior based on actual driving conditions and/or other expected object behaviors.

In examples, the simulated vehicle control data and the simulated object data may comprise a simulation scenario. The simulated vehicle control data may simulate data that causes a first vehicle response and the simulated object data may simulate an object that interferes with the first vehicle response. For example, in response to the simulated vehicle control data, the vehicle control device may generate a first trajectory along which a simulated vehicle will "drive," and, in response to the simulated object data, the vehicle control device may perceive a simulated object and determine that the simulated vehicle, travelling along the first trajectory, will collide with the simulated object. For instance, the simulated vehicle control data may be processed by a primary system of the vehicle control device whereas the simulated object data may be processed by a secondary system of the vehicle control device, as described herein. By pairing the simulated vehicle control data with the simulated object data, the simulation scenarios may simulate scenarios that are purposefully adversarial, e.g., to test the back-up or emergency response systems of the vehicle control system.

In some examples, the simulation scenarios can be generated in an agnostic parameter space, e.g., free from other variables often encountered when driving. For instance, the agnostic parameter space can be a two-dimensional plane simulating an unbounded driving surface free from obstacles, except objects purposefully simulated by the simulated object data. Accordingly, implementations of this disclosure may provide targeted scenarios that determine how (and whether) a collision avoidance system reacts to adverse situations. The simulation scenarios may be generated to test the vehicle control system in situations that may be very unlikely to be encountered, but that are possible given the dynamics of a vehicle and/or the dynamics of objects that may be encountered by the vehicle.

In some examples, a simulation system can receive information about responses generated by the vehicle control system in response to the simulation scenarios. For example, the simulation system can receive responsive controls generated by a secondary system, e.g., a collision avoidance system, of the vehicle control data. Such responsive controls may be controls that cause a system controller of a vehicle to take some action in view of a predicted collision, e.g., to decelerate quickly, to swerve, to ready or implement a safety feature, or the like. In some examples, the simulation system can simulate the vehicle action implementing the response controls, compare the simulated action to the simulated object's trajectory, and determine whether the simulated vehicle collides with the simulated object or avoids the collision. In such examples in which a collision is avoided, the system may determine a safety margin with which the collision was avoided (temporally, spatially, etc.). In some examples, e.g., in which the collision is not avoided, the simulation system may determine details of the collision, e.g., speed at impact, position at impact, location of impact, whether safety features were deployed, or the like. In some examples, the simulation scenarios and/or the result may be compared to operating standards, e.g., to certify or otherwise determine a safety of the vehicle control system.

Moreover, in some implementations, the results of the simulation system may be used to implement changes in the vehicle control system. For example, the simulation system may identify scenarios for which a collision was not avoided and cause the vehicle control system to implement actions that can further reduce the likelihood that such scenarios will occur. Such actions may be embodied as one or more operational parameters that will increase the likelihood of safe travel. By way on non-limiting example, the simulation system may identify a maximum safe operating speed, e.g., lower than a maximum vehicle speed, at which the vehicle can mitigate collisions according to most scenarios as one of a number of operational parameters. Other operational parameters may include maximum accelerations, minimum and/or maximum turning radiuses, minimum distances to maintain from objects, or the like. In other examples, various parameters (response times of actuators, processing times of various algorithms, etc.) may be inspected to assess which would likely improve response to a given scenario (e.g., avoid collision, reduce impact, etc.) and information about such inspection(s) can be included in the operational parameters.

In examples, the techniques and/or systems discussed herein may enhance safety of passengers in a vehicle and/or other individuals in proximity to the vehicle. For instance, implementations described herein may provide systems and techniques that test a secondary system's ability to independently detect an object in proximity to the vehicle and perform a maneuver to avoid or mitigate damage associated with a collision. in examples, the secondary system may be a higher integrity (e.g., more verifiable) and/or less complex system than the primary system. For instance, the secondary system may be designed to process less data, include a shorter processing pipeline than the primary system, operate according to techniques that are more easily verifiable than the techniques of the primary system, and so on.

In examples, the techniques discussed herein may be used with collision avoidance systems such as those discussed in U.S. patent application Ser. No. 16/232,863, filed Dec. 26, 2018, and entitled "Collision Avoidance System," which may implement techniques including those discussed in U.S. patent application Ser. No. 16/189,726, filed Nov. 11, 2018, and entitled "Perception Collision Avoidance," and/or U.S. patent application Ser. No. 16/218,182, filed Dec. 12, 2018, and entitled "Collision Avoidance System with Trajectory Validation." The entire contents of each of the foregoing are incorporated herein by reference.

The methods, apparatuses, and systems described herein may be implemented in a number of ways. Example implementations are provided below with reference to the following figures. Although discussed in the context of an autonomous vehicle, in some examples, the methods, apparatuses, and systems described herein may be applied to a variety of systems. In another example, the methods, apparatuses, and systems may be utilized in an aviation or nautical context. Additionally, or alternatively, the techniques described herein may be used with real data (e.g., captured using sensor(s)), simulated data (e.g., generated by a simulator), or any combination thereof.

FIG. 1 illustrates an example environment 100 in which the techniques discussed herein may be implemented. Specifically, the example environment 100 shows an autonomous vehicle 102 (which may be simulated) driving through the environment 100 in accordance with a vehicle trajectory 106 determined by the vehicle 102. In the example illustrated, object 104 (a pedestrian in the environment) may be introduced into such a simulation after a point in time in which vehicle trajectory 106 is already generated by the vehicle 102 and having an object trajectory 108.

In the example of FIG. 1, the illustrated vehicle trajectory 106 and the illustrated object trajectory 108 are such that, absent some course change, the vehicle 102 and the object 104 will collide. Accordingly, to avoid such collisions, the vehicle 102 may include a vehicle control system that receives sensor data, e.g., from the sensor(s) 110, recognizes the collision, and modifies the vehicle trajectory 106. For example, the vehicle control system may decelerate the vehicle 102 as quickly as possible, e.g., to a stop, change the path of the vehicle 102, or take some other action that avoids a collision with the object 104. In other instances, e.g., instances in which the collision cannot be avoided, the vehicle 102 may take measures to mitigate the imminent collision. For example, the vehicle 102 may deploy airbags or other barriers, may tension seat belts, and/or take other actions to protect one or both of the object 104 and/or passengers in the vehicle 102.

In more detail, and as illustrated in FIG. 1, the autonomous vehicle 102 can include a first (or primary) system 112 and a second (or secondary) system 114. The primary system 112 may generally implement artificial intelligence (e.g., AI techniques 116) to perform a variety of operations. The secondary system 114 may generally implement different techniques to, among other features, identify objects (such as the object 104) and/or events that that can result in a collision, and take over control of the autonomous vehicle 102, if needed. For example, the primary system 112 can process data from the sensor(s) 110 to generate one or more trajectories 118 (which may include the vehicle trajectory 106) along which the autonomous vehicle 102 is to be controlled. The primary system 112 may send the one or more trajectories 118 to the secondary system 114 and the secondary system 114 may evaluate the one or more trajectories 118 and/or determine a trajectory for controlling the vehicle. In at least some examples, the primary system 112 may operate at a first frequency and the secondary system 114 may operate at a second frequency, which may differ from the first. In examples, a vehicle trajectory may comprise one or more controls for a steering angle and/or acceleration of the autonomous vehicle 102, e.g., to maintain the vehicle 102 on the illustrated path. Further, a trajectory may comprise a sequence of times and vehicle states (e.g., poses) which represent an estimated future path of the autonomous vehicle 102. For example, a trajectory may control a path, e.g., the illustrated path, that the autonomous vehicle 102 will take over a window of time (e.g., one millisecond, half a second, two seconds, ten seconds, etc.). A trajectory may be continuously updated over time to control motion of the autonomous vehicle 102.

In some implementations, the primary system 112 may control the vehicle during normal operation. The primary system 112 may be the main computing system on the autonomous vehicle 102. The primary system 112 may implement the AI techniques 116 to understand an environment around the autonomous vehicle 102 and/or instruct the autonomous vehicle 102 to move within the environment. The AI techniques 116 may include machine learning (also referred to, generally, as machine learned models), such as one or more neural networks. For example, the primary system 112 may analyze data generated by the sensor(s) 110 to localize the autonomous vehicle 102, detect an object around the autonomous vehicle 102, segment sensor data, determine a classification of the object, predict an object track, generate the one or more trajectories 118 for the autonomous vehicle 102, and so on.

The secondary system 114 may evaluate the primary system 112 and take over control of the autonomous vehicle 102 in certain anomalous conditions, e.g., when a collision is likely based on the one or more trajectories 118 and a detected object position or track. The secondary system 114 may implement secondary techniques (e.g., probabilistic techniques, techniques that are different from the AI techniques 116, etc.) that are based on position, velocity, acceleration, etc. of the autonomous vehicle 102 and/or objects around the autonomous vehicle 102. In some examples, the AI techniques 116 may use neural networks, while the secondary system 114 may refrain from using such neural networks. In other examples, the secondary system 114 may perform AI techniques, such as implementing a machine learned model that is different (or the same in some instances) from a machine learned model implemented by the primary system 112. In examples, the secondary system 114 may have a different range of vision than the primary system 112 (e.g., detect and/or process sensor data at a different range than the primary system 112), operate at a different rate of processing than the primary system 112 (e.g., process instructions at a faster (or slower in some cases) rate than the primary system 112), and so on.

In examples, the secondary system 114 may process sensor data, e.g., from the sensor(s) 110 to determine a position and/or orientation (together a pose) of the autonomous vehicle 102 relative to a point and/or object in an environment. Further, the secondary system 114 may process the data to detect objects around the autonomous vehicle 102, track the objects over time, and/or predict trajectories for the objects. In some examples, the secondary system 114 may receive information from the primary system 112 indicating tracks of objects that are detected by the primary system 112 and/or predicted trajectories of the objects. A track of an object may include a path traveled by the object (e.g., previous states—positions, orientations, velocities, etc., as well as center locations, extents, etc., and/or uncertainties associated therewith). A track of an object may represent (or be based on) a current or previous position, velocity, acceleration, orientation, and/or heading of the object over a period of time (e.g., 5 seconds). The secondary system 114 may maintain a track and/or predicted trajectory for each object detected around the autonomous vehicle 102. In the example of FIG. 1, the secondary system 114 estimates the object trajectory 108 for the object 104. Here, the object 104 represents a person, although the object 104 may represent any type of object, such as another vehicle, a structure (e.g., building, etc.), an animal, a sign, and so on.

In examples, the secondary system 114 may have limited functionality (e.g., compared to the AI techniques 116) such that the secondary system can evaluate the one or more trajectories 118 relatively quicker and/or may comprise high integrity algorithms which are inspectable and/or verifiable. By way of non-limiting example, the secondary system 114 may receive the same data generated by the sensor(s) 110, but may subject the data to less processing. For example, the secondary system 114 can determine objects from sensor data (e.g., from the sensor(s) 110 and which sensor data may the same or different from data used by the primary system 112 to determine the one or more trajectories 118). In some instances, the secondary system 114 may consider data from fewer than all sensor modalities on the vehicle to detect objects.

The secondary system 114 may include a collision determination component 120 with functionality to compare the one or more trajectories 118 to detected object(s) in the environment and determine whether a collision is likely. For example, the collision determination component may compare detected objects, e.g., a position, trajectory, or the like of the detected objects, to the one or more trajectories 118 to determine a probability of a collision of the vehicle 102 with a detected object (such as the object 104). In some instances, e.g., in which the probability that the one or more trajectories 118 will result in a collision with an object is equal to or above a threshold probability, the secondary system 114, e.g., using a response generation component 122, may determine an action for responding to the likely collision. For instance, the response generation component 122 can generate one or more responsive controls 124, which may cause the vehicle to decelerate, e.g., to a stop, swerve, or take some other action different from the one or more trajectories 118. In other examples, e.g., examples in which the collision determination component 120 does not determine a likely collision, the response generation component 122 may generate the responsive control(s) 124 as controls for following the one or more trajectories 118, e.g., to implement the course of action generated by the primary system. In implementations, the responsive controls 124 may be a trajectory, e.g., the one or more trajectories 118 or a response trajectory, e.g., generated by the response generation component 122 in response to the collision determination component 120 determining a collision, or other controls for executing the trajectory. In operation, the responsive control(s) 124 may be sent to and used by a system controller or other execution component to control functioning of the vehicle 102.

The sensor(s) 110 may include a variety of sensors, such as light detection and ranging (LIDAR) sensors, RADAR sensors, ultrasonic transducers, sonar sensors, location sensors (e.g., global navigation satellite system (GNSS) (including global positioning systems (GPS)), compass, etc.), inertial sensors (e.g., inertial measurement units (IMUs), accelerometers, magnetometers, gyroscopes, etc.), cameras (e.g., red-green-blue (RGB), infrared (IR), intensity, depth, etc.), time of flight sensors, microphones, wheel encoders, environment sensors (e.g., temperature sensors, humidity sensors, light sensors, pressure sensors, etc.), etc.

As noted above, both the primary system 112 and the secondary system 114 may generally process data, including data generated by the one or more sensor(s) 110. In some examples, the secondary system 114 may use a subset of the data used by the primary system. For example, the primary system 112 may receive (or consider) data from a wide variety of the sensor(s) 110, such as location data, inertial data, LIDAR data, RADAR data, image data, audio data, environmental data, depth data, etc. Meanwhile, the secondary system may receive (or consider) data from a more limited set of the sensor(s) 110, such as LIDAR data, RADAR data, and/or time of flight data. In other examples, the secondary system 114 may receive (or consider) the same or more data as the primary system 112, such as one or more of location data, inertial data, LIDAR data, RADAR data, image data, audio data, environmental data, and/or depth data. In at least some examples, the subsets of sensor data used by the secondary system 114 may be based on, for example, one or more processes and may differ from one another. As a non-limiting example, whereas the primary system 112 may use all sensor(s) for localization and object detection, localization on the secondary system 114 may only use IMU and wheel odometry data and object detection on the secondary system 114 may only use LIDAR data.

Thus, while the secondary system 114 may be configured as a backup or emergency system that acts to avoid, or mitigate damage caused by, collisions, testing the secondary system can prove difficult. The primary system 112 is generally controlling the autonomous vehicle 102, and only in limited circumstances is the secondary system 114 used to override controls from the primary system 112. Implementations described herein also include a simulation system 126 that can test the autonomous vehicle 102, and, in particular, test the secondary system 114.

As illustrated, the simulation system 126 includes one or more computing device(s) 128 executing a simulation scenario generation component 130 and a simulation evaluator 132.

The simulation scenario generation component 130 is configured to generate simulation scenarios 134 that may be used to test a control system of the autonomous vehicle 102, including, specifically, reaction by the secondary system 114 to likely collisions. For example, the simulation scenarios 134 may include data that simulates a driving environment of the autonomous vehicle 102, aspects of the autonomous vehicle 102, and/or objects in the environment of the autonomous vehicle 102. In more detail, and as illustrated in FIG. 1, the simulation scenarios 134 may include simulated vehicle data 136 and simulated object data 138. For example, the simulated vehicle data 136 may replicate data, such as sensor data generated by the sensor(s) 110, that causes the primary system 112, e.g., using the artificial intelligence techniques 116, to generate the one or more trajectories 118. Byway of non-limiting example, the simulated vehicle data 136 may cause the primary system 112 to determine a pose of a simulated vehicle, a state of the simulated vehicle, a trajectory along which the simulated vehicle travels, e.g., the vehicle trajectory 106, the speed of the simulated vehicle, an acceleration of the simulated vehicle, and/or other information that simulates a position and/or movement of a vehicle. In some examples, the simulated vehicle control data may be data of any type used in a vehicle control system, including raw sensor data and/or processed data, e.g., from a localizer, a planner, a perception component, a prediction component, or other components described herein. The simulated object data 138 may replicate data, such as sensor data generated by the sensor(s) 110, that causes the secondary system 114, e.g., executing the collision determination component 120, to determine a collision. Of course, in other examples, such simulated data may comprise any higher-level data (e.g., position, locations, track information, etc.) regarding one or more objects as may be output by one or more perception, prediction, tracking, etc. components. Accordingly, in examples described herein, each of the simulation scenarios may include first data, e.g., the simulated vehicle data 136, that causes a vehicle control system to carry out a driving operation, such as determining the one or more trajectories 118 and second data, e.g., the simulated object data 138, that causes the vehicle control system to perceive a collision and respond in some way. Stated differently, the simulation scenarios 134, via the simulated vehicle data 136 and the simulated object data 138, create an antagonist vehicle trajectory and object trajectory, respectively, that should be perceived as causing a collision, as in the case of the vehicle trajectory 106 and the object trajectory 108. In at least some examples, such simulated object data 138 may be intentionally injected into simulation at a point at which the primary system 112 is unable to detect and/or respond to the simulated object data 138, so that the ability of the secondary system 114 to react to such anomalies may be tested.

The simulation evaluator 132 may receive an output of the secondary system 114, such as information about the responsive control(s) 124 discussed above. In some examples, the simulation evaluator 132 may determine whether a response of the autonomous vehicle 102 is within some threshold response or that the control system of the autonomous vehicle 102, performs in accordance with some standard or recommendation. For instance, the simulation evaluator 132 may determine a simulated outcome and compare the outcome to an expected or desired outcome. In some examples, the simulation evaluator 132 can receive information about the responsive control(s) 124 and information about the simulated object data 138 and based on the responsive control(s) 124 and the simulated object data 138 to determine such parameters. In some instances, the outcome may be a binary determination, e.g., collision or avoidance. In other instances, e.g., when the simulated outcome is a collision, the simulation evaluator 132 may determine aspects of the simulated vehicle (e.g., speed, trajectory, position, orientation) and/or of the object (e.g., position, pose) at the time of collision. The simulation evaluator 132 may use such aspects to determine a severity or result of the collision. Also in implementations, the simulation evaluator 132 may determine a simulated outcome of the collision between the object and the original trajectory, e.g., in the absence of a response to the simulated object. Such outcome may then be compared to the outcome resulting from implementation of the responsive control(s). In some examples where no collision is determined, the simulation evaluator 132 may, nonetheless, determine one or more additional parameters as metrics of how close or far the vehicle performed with respect to expected and/or desired outcomes (e.g., did the collision avoidance exceed some threshold, did control of the vehicle perform within tolerances (e.g., with respect to braking, steering, etc.), etc.).

The simulation evaluator 132 can also compare the simulated outcome to other performance characteristics. For example, passenger safety and comfort outcomes of the simulated outcome may be determined to discern the impact of the avoidance maneuvers on passengers in the vehicle. Moreover, impact to the vehicle 102 can also be modeled and determined.

Accordingly, the simulation system 126 may be used to test a control system of the autonomous vehicle 102 by providing simulated data, e.g., as the simulation scenarios 134 and evaluating a response of the vehicle control system to those scenarios. In examples, the simulation scenarios may be based on dynamics associated with the vehicle and/or dynamics of objects likely to be encountered by the vehicle. In some examples, the simulation scenarios may be modeled based on vehicle requirements or standards, e.g., to validate vehicle control systems for public use and/or determine particular operational domains for the vehicle in the world (e.g., validated for less than 25 mph, validated for regions in which no pedestrians exist (e.g., highways), validated in all conditions, etc.).

Figure 2:
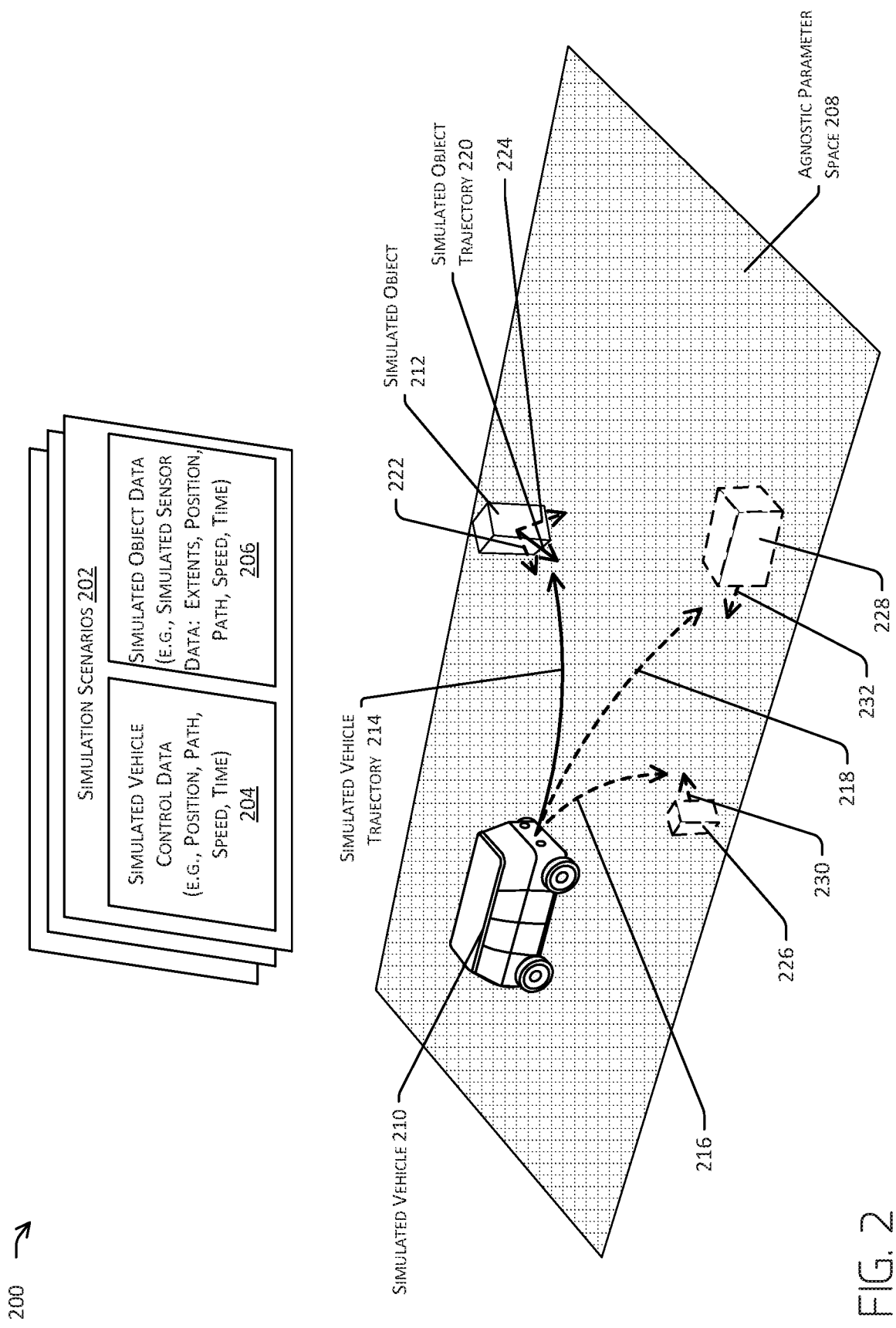
FIG. 2 is a schematic representation illustrating techniques for generating scenarios for testing collision avoidance systems.

FIG. 2 is a representation of a simulated environment 200 used to visualize simulation scenarios 202 (which may be the simulation scenarios 134) and generation of the simulation scenarios 202 for use in collision avoidance testing techniques. In the example of FIG. 2, the simulation scenarios 202 include simulated vehicle control data 204 and simulated object data 206. The simulated vehicle control data 204 may be the simulated vehicle data 136 and/or the simulated object data 206 may be the simulated object data 138.

In examples of this disclosure, the simulated scenarios 202 may be generated in an agnostic environment. For example, FIG. 2 illustrates an agnostic parameter space 208. The agnostic parameter space 208 may be a two-dimensional plane free of any constraints, such as friction, grade, environmental conditions, or the like. For instance, because aspects of this disclosure may be directed to triggering the collision avoidance system, and the collision avoidance system may react only to discrete objects in an environment, the simulation scenarios 202 may be concerned only with a simulated vehicle 210 and a simulated object 212 in the agnostic parameter space 208. As shown, the simulated vehicle 210 is positioned at some location (e.g., an x-y coordinate) in the agnostic parameter space 208. From the starting position, the simulated vehicle 210 may proceed along any of a number of simulated trajectories. A first simulated trajectory 214 is shown in FIG. 2, and may be the same as or similar to the vehicle trajectory 106 from FIG. 1. Additional example simulated vehicle trajectories 216, 218 also are shown. In examples of this disclosure, the simulated vehicle trajectories 214, 216, 218 (or any other simulated trajectory) may be chosen to comport with dynamic capabilities or parameters of the vehicle upon which simulation is to be performed. Thus, for example, the simulated vehicle 210 may have attributes consistent with attributes of an autonomous vehicle, such as the autonomous vehicle 102. Such dynamic parameters may include, but are not limited to, a range of speeds associated with the vehicle, a range of accelerations of which the simulated vehicle 210 may be capable, a range of steering angles, a maximum deceleration of the vehicle, or the like. The simulated vehicle control data 204 may be generated to cause the simulated vehicle 210 to proceed along a desired trajectory, e.g., one of the simulated vehicle trajectories 214, 216, 218. In some examples, the simulated vehicle control data 204 can also take into account other attributes of the simulated vehicle 210, although such attributes can generally be embodied through acceleration/deceleration ranges, speed ranges, and/or turning radius ranges. By way of non-limiting example, a vehicle's mass may vary, e.g., based on a type of vehicle, number and weight of passengers, weight of cargo, and the like, but the simulated vehicle control data can take these variations into account by simulating a lower maximum acceleration, lower maximum deceleration, and/or the like. Similarly, changes in braking capability of the simulated vehicle 210, e.g., due to break wear, or the like, can also be embodied as relatively lower maximum decelerations. Other aspects and attributes of the simulated vehicle 210 may also betaken into account in determining vehicle dynamics and/or kinematics including, but not limited to, component specifications (e.g., electric motor maximum torques, maximum braking forces associated with brakes, signal propagation times through electronics, computational times for various processes, and the like).

As also illustrated in FIG. 2, the simulated object 212 is also simulated in the agnostic parameter space 208. For instance, the simulated object 212 may have extents, e.g., embodied as a three-dimensional bounding box, as well as a position and a path, such as a simulated object trajectory 220. In examples of this disclosure, the simulated object 212 and the simulated object path 220 may be selected based on dynamics of known objects. Thus, for example, the simulated object 212 can be sized to approximate a pedestrian, as in the object 104. In at least some examples, such a simulated object 212 may be represented in simulation as a mesh, a convex hull, a collection of points, or, otherwise, any higher level of data representative of the object which may be used by any one or more subsystems of the primary and/or secondary systems (bounding boxes, segmentations, tracks, and the like). In at least some examples, such a simulated object 212 (and corresponding trajectories) may be instantiated in such a simulation at a point in time at which a primary system of the simulated vehicle 210 is unable to account for the object, while the secondary system can.

The simulated object trajectory 220 may then be chosen based on attributes associated with pedestrians. For example, pedestrians can generally move in any direction from a current position at some speed up to and including a maximum speed and with some acceleration up to a maximum acceleration. In some examples, the size, speed, and/or acceleration ranges associated with the simulated object 212 may be based on object models, driving logs, or other information. In some examples, such object trajectories 220 may be determined based at least in part on one or more of the simulated vehicle 210 position, orientation, velocity, acceleration, trajectory, etc. to be adversarial (having trajectories intentionally determined to collide with the vehicle as aggressively as possible). As also illustrated in FIG. 2, the simulated object 212 may travel along the simulated object trajectory 220, or along some other object trajectory. For example, alternative simulated object trajectories 222, 224 for the simulated object 212 are illustrated in FIG. 2. The simulated object data 206 may be generated to cause the vehicle control system, e.g., the secondary system 114, to perceive the simulated object 212 at the relative position illustrated and proceeding along the simulated object trajectory 220 (or one of the alternative simulated object trajectories 222, 224).

The simulated vehicle 210 and the simulated object 212 may be used to simulate a number of scenario variations. For example, the simulated vehicle 210 travelling along the simulated vehicle trajectory 214 and the simulated object 212 travelling along the simulated object trajectory 220 may represent a single scenario 202, such as the scenario including the autonomous vehicle 102 and the object 104 shown in FIG. 1. An associated one of the simulation scenarios 202, then, may include simulated vehicle control data 204 that causes a vehicle control system to generate the simulated vehicle trajectory 214 and simulated object data 206 that causes the vehicle control system to perceive the simulated object 212 travelling along the simulated object trajectory 220. Variations of the scenario including the simulated vehicle 210 and the simulated object 212 also may be embodied in different simulations scenarios. For instance, such variation may vary the speed, acceleration, or the like. As such, particular limitations of such a secondary system may be determined. Alternative simulation scenarios 202 may also be generated for the simulated vehicle 210 and the simulated object 212, but may be based on the alternative simulated vehicle trajectories 216, 218 and/or the alternative simulated object trajectories 222, 224. Additional simulation scenarios can also be generated for other simulated objects. For instance, FIG. 2 also shows alternative simulated objects 226, 228 having associated example object trajectories 230, 232, respectively. In at least some examples, scenarios may also vary with respect to the number of objects to determine limitations of the secondary system tracking and overcoming objects and/or combinations of types of objects.

In implementations, the simulated vehicle trajectories 214, 216, 218 and the simulated objects 212, 226, 228 (with their associated trajectories) are purposefully antagonistic. That is, the simulations will result in a determination by the vehicle control system that the simulated vehicle 210 will collide with the simulated object(s) 212, 226, 2228 and, in some instances, with as large of a relative velocity as possible based on the class of object. Accordingly, the simulation scenarios 202 will cause the secondary system of the vehicle control system to take some action to avoid and/or mitigate an imminent, simulated collision.

In the example, because the simulated vehicle trajectory 214 may have any number of variations, e.g., acceleration, speed, or the like, and/or because the simulated object 212 may have any number of simulated trajectories (and/or paths), including, but not limited to the simulated object trajectories 220, 222, 224, a number of possible scenario variations is essentially limitless. Even when the simulated object 212 and the simulated vehicle 210 are constrained by their respective dynamic limits, a number of scenarios can be infinite. Accordingly, techniques described herein may generate the simulation scenarios 202 as cases that are edge cases, cases that are unlikely to be regularly encountered during normal driving, and/or cases that are not easily reproduced in the physical world. So, for example, one simulation scenario 202 for the simulated vehicle 210 and the simulated object 212, as illustrated, may include the simulated vehicle 210 traveling along the simulated vehicle trajectory 214 at a maximum velocity for the vehicle. For example, the maximum velocity may be the maximum speed at which the vehicle may physically travel, a maximum speed for a geographic area, or some other maximum speed. Similarly, in a most extreme case, the simulated object 212 may be moving at a maximum speed (for the type of simulated object) directly toward the simulated vehicle 210. Thus, for example, a "worst-case" scenario would be a vehicle traveling at maximum speed and a pedestrian running at maximum speed in the opposite direction, directly into the vehicle's path. A simulation scenario of the simulation scenarios 202 may re-create this scenario by generating the simulated vehicle control data 204 and the simulated object data 206. Additional simulation scenarios 202 can include modifications the "worst-case" scenario. By way of non-limiting example, a second scenario could have the simulated vehicle trajectory 214 have an incrementally slower speed than the maximum speed and/or have an incrementally slower speed for the simulated object 212.

In addition to including information about an extent, position, path, speed, classification, and/or acceleration of the simulated object 212, the simulation scenarios 202 can also include temporal information. For instance, some of the simulation scenarios 202 may be designed such that the simulated object 212 is not perceptible until after the simulated vehicle 210 is travelling, e.g., after initialization of the simulated vehicle trajectory 214 (e.g., by a primary system). Consider an example in which the simulated object 212 is intended to simulate a child running into the street, e.g., to retrieve a ball. A simulation scenario 202 could have simulated vehicle control data 204 that causes the vehicle to travel along the simulated vehicle trajectory 214, but that causes the simulated object data 206 to be received at some time after which the simulated vehicle 210 is executing the simulated vehicle trajectory 214. Thus, the vehicle control data 204 may be configured to cause the primary system to generate trajectories 118 at some initial time, but the simulated object data may be configured to cause the secondary system 114 to perceive the simulated object 212 at some later time, e.g., t=1.0 s, 2.0 s, or the like.

Figure 3:
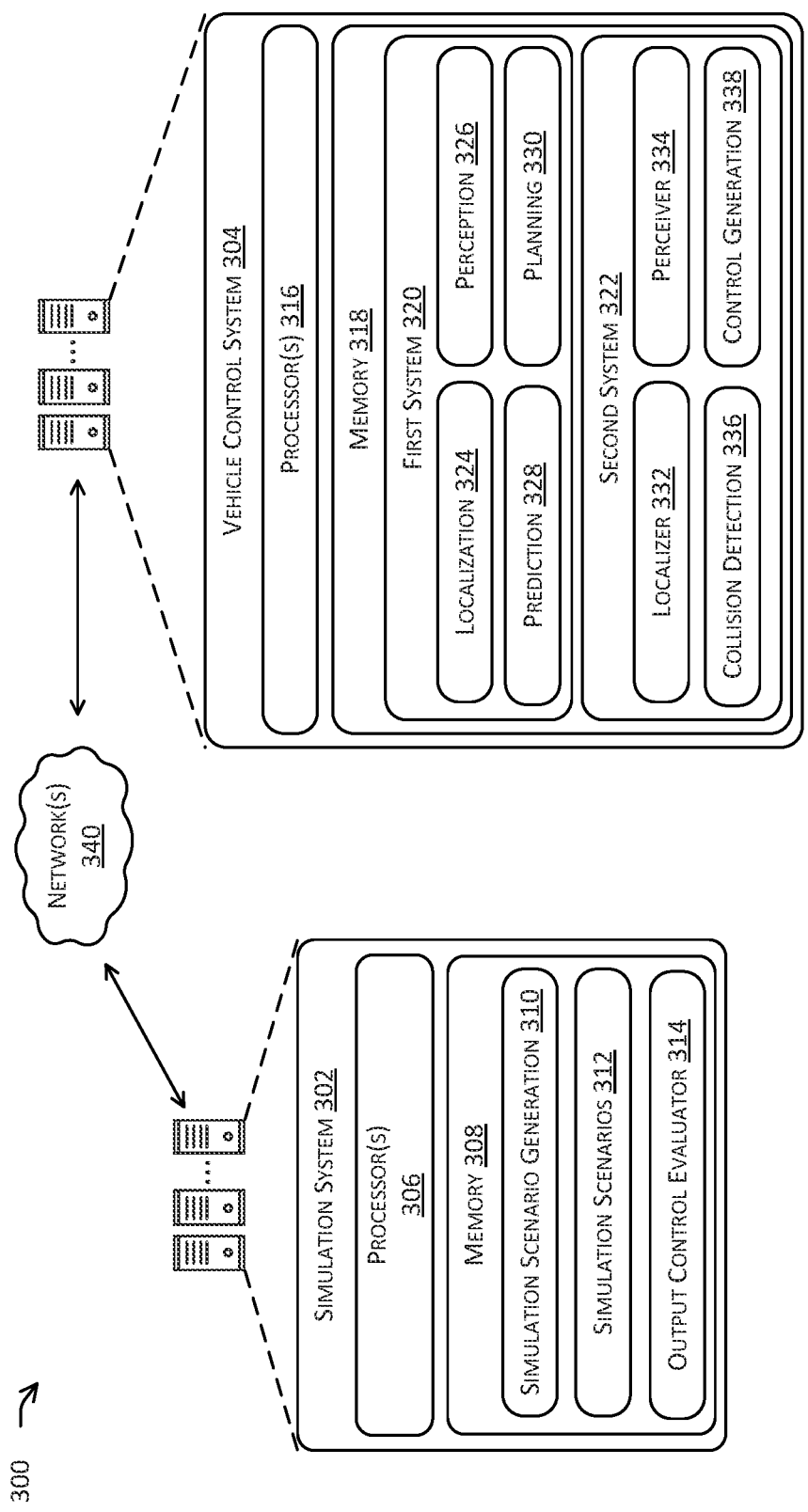
FIG. 3 includes a block diagram of an example architecture for implementing collision avoidance system testing techniques, as described herein.

FIG. 3 illustrates an example computing environment 300 that may be used to implement collision avoidance system testing according to the techniques described herein. For example, the environment 300 may include a simulation system 302, which may correspond to the simulation system 126 of FIG. 1 and a vehicle control system 304, e.g., which may be used to control the autonomous vehicle 102. In the illustrated example, the simulation system 302 and the vehicle control system 304 are illustrated as discrete computing systems, communicating over one or more networks 340 although in other implementations functionality of each of the systems 302, 304, may be carried out in the same computing environment. By way of non-limiting example, software executing the functionality of the vehicle control system may be uploaded or otherwise incorporated into the simulation system 302 and/or software executing the simulation system 302 may be uploaded to or otherwise made incorporated into the vehicle control system.

The simulation system can include one or more processors 306 and memory 308 communicatively coupled with the one or more processors 306. In the illustrated example, the memory 308 of the simulation system 302 stores a simulation scenario generation component 310, simulation scenarios 312, and an output control evaluator 314. Though depicted in FIG. 3 is residing in the memory 308 for illustrative purposes, it is contemplated that several of the features, including the simulation scenario generation component, the simulation scenarios 312, and/or the output control evaluator 314 may additionally, or alternatively, be accessible to the simulation system through to (e.g., stored remotely).

In at least one example, the simulation scenario generation component 310 can include functionality to generate simulation scenarios 312. As described herein, the simulation scenarios 312 may include simulated vehicle control data that causes a primary system of a vehicle control system to generate a driving control, e.g., a trajectory, speed, state, of the like, and simulated object control data that causes a secondary system of the vehicle control system to detect a collision and generate a response to that detected collision. In some examples, the simulation scenario generation component 310 can include functionality to simulate scenarios as described above in connection with FIG. 2. For example, the simulation scenario generation component 310 can generate simulation scenarios that are purposefully antagonistic, thereby triggering a response by a secondary, e.g., collision avoidance, system.

The output control evaluator 314 can include functionality to determine an outcome of a simulation of a simulation scenario. The output control evaluator 314 may perform functions similar to (or the same as) the simulation evaluator 132 discussed above. By way of non-limiting example, the output control evaluator 314 can receive information about responses generated by a secondary system of the vehicle control system 304, e.g., in response to determining a likely collision. In some instances, the output control evaluator may determine a simulated outcome for a simulated vehicle implementing response controls generated by the secondary system. An outcome may be a simulated collision or a simulated avoidance, for example.

The vehicle control system 304 can include one or more processors 316 and memory 318 communicatively coupled with the one or more processors 316. In the illustrated example, the vehicle control system 304 may be associated with an autonomous vehicle; however, the vehicle control system 304 can be implemented in other types of vehicles. In the illustrated example, the memory 318 includes a primary system 320 and a secondary system 322, which may correspond to the primary system 320 and the secondary system 322 described above, respectively. Although FIG. 3 shows the memory 318 including the primary system 320 and the secondary system 322 as separate components, in other examples components of the primary system 320 and the secondary system 322 may be otherwise arranged.

In the illustrated example, the primary system 320 includes at least a localization component 324, a perception component 326, a prediction component 328, and a planning component 330. The localization component 324, the perception component 326, the prediction component 328, and/or the planning component 330 may collectively and/or individually include a processing pipeline that implements one or more machine learned models, such as neural networks, that accomplish a variety of functions. Each processing pipeline may receive data and provide an output. In one example, the perception component 326 implements one or more neural networks in a processing pipeline to perform object detection, segmentation, and/or classification, in addition to (or alternative to) determining predicted motion of detected objects. Each stage in the pipeline may provide some aspect of perception (e.g., object detection, classification, bounding box generation, and the like) that may feed into another stage of the pipeline (e.g., provide output from one machine learned model as input into another machine learned model). In examples, the primary system 320 implements multiple neural networks that are trained using thousands or hundreds of thousands of hours of vehicle training data (which may include synthetic or simulated data). Further, the multiple neural networks may be configured to perceive a myriad of complex scenarios and control an autonomous vehicle in view of those scenarios. Generally, in any example, the primary system 320 and the secondary system 322 may rely on similar and/or dissimilar hardware. In examples, the primary system 320 may use parallel computing (e.g., in a GPU), while the secondary system 322 may not. In other examples, parallel computing is used in the primary system 320 and/or the secondary system 322.

As described herein, an exemplary neural network is a biologically inspired algorithm which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

The localization component 324 may include functionality to receive the sensor data from one or more sensor(s)(not illustrated in FIG. 3) to determine a pose (e.g., position and/or orientation) of the autonomous vehicle relative to a map of an environment surrounding the vehicle. For example, the localization component 324 may determine and/or receive a map of an environment and may continuously determine a location of the autonomous vehicle within the map. The map may comprise a topological map, an occupancy grid, a point map, a landmark map, a mesh, a graph of pose constraints, and/or any other suitable map. In some instances, the localization component 324 may utilize SLAM (simultaneous localization and mapping) or CLAMS (calibration, localization and mapping, simultaneously) to receive image data, LIDAR data, RADAR data, IMU data, GPS data, wheel encoder data, and/or the like to accurately determine a location/pose of the autonomous vehicle. The location of the autonomous vehicle 102 may comprise a pose that includes a relative position and/or orientation of the autonomous vehicle 102 in relation to point(s) and/or object(s) in the map, a local coordinate, and/or a global coordinate (e.g., a GPS coordinate). In additional or alternate instances, the orientation may include an indication of a yaw, roll, and/or pitch of the autonomous vehicle 102 relative to a reference plane and/or relative to point(s) and/or object(s) in the map. Together the position and/or orientation may describe a "pose."

In some instances, the localization component 324 may provide data to various components of the autonomous vehicle. For example, the localization component 324 may provide a pose of the autonomous vehicle to the planning component 330 to generate a trajectory, as discussed below. In other examples, the localization component 324 may provide a pose of the autonomous vehicle to other components of the autonomous vehicle 102, such as the perception component 326 and/or the prediction component 328.

The perception component 326 may include functionality to perform object detection, segmentation, and/or classification. In some examples, the perception component 326 may receive sensor data as input and output primary perception data that indicates a presence of an object that is proximate to the autonomous vehicle and/or a classification of the object as an object type (e.g., a semantic label such as, for example, car, pedestrian, cyclist, animal, building, tree, road surface, curb, sidewalk, unknown, etc.). Additionally, or alternatively, the perception component 326 may provide processed sensor data that indicates one or more characteristics associated with a detected object and/or the environment in which the object is positioned. In some examples, characteristics associated with an object may include, but are not limited to, an x-position (e.g., global position, relative position, etc.), a y-position (e.g., global position, relative position, etc.), a z-position (e.g., global position, relative position, etc.), an orientation, an object type (e.g., a classification), a velocity of the object, an extent of the object (size), etc. and/or associated uncertainties. In some examples, a velocity of an object may be determined from multiple detections of the same object in subsequent data, RADAR processing and/or other techniques. Characteristics associated with the environment may include, but are not limited to, a presence of another object in the environment, a state of another object in the environment, a time of day, a day of a week, a season, a weather condition, an indication of darkness/light, etc.

In some instances, the perception component 326 may provide primary perception data and/or processed sensor data to various components of the autonomous vehicle. For example, the perception component 326 may provide primary perception data and/or processed sensor data to the planning component 330 and/or the prediction component 328. In other examples, the perception component 326 may provide primary perception data and/or processed sensor data to other components of the autonomous vehicle, such as the localization component 324. In examples, primary perception data and/or processed sensor data may be in the form of a primary object list including a list of objects and/or characteristics for each of the objects.

The prediction component 328 may associate a track with a detected object and/or predict an object trajectory. A track of an object may comprise historical object position, velocity, acceleration, and/or orientation. In some instances, the prediction component 328 may determine whether or not to associate a historical object track with an object recently detected by the perception component 326. For example, the prediction component 328 may determine whether a recently-detected object has similar features with respect to the object as previously detected (e.g., similar feature map, proximate embeddings, similar visual features (FAST, BRISK, ORB, etc.), and the like), is within a threshold distance of a previous position of the object associated with the historical track, a threshold velocity of a previous velocity of the object associated with the historical track, etc. In some examples, the prediction component 328 may include machine learned models to predict a behavior of an object in the environment based on lighting state (e.g., blinker detection), object velocity/acceleration, map data (e.g., lane information indicating reasonable driving behaviors), and/or learned object behaviors. In some examples, the prediction component 328 may predict one or more predicted object trajectories for a specific object detected by the perception component 326 based on, for example, probabilistic determinations or multi-modal distributions of a historical, current, and/or or predicted position, velocity, acceleration, and/or orientation of an object.

In some instances, the prediction component 328 may provide data regarding an object track, predicted object trajectories (e.g., one or more trajectories and associated uncertainties), and/or other data to various components of the autonomous vehicle. For example, the prediction component 328 may provide such data to the planning component 330. In some examples, the prediction component 328 may generate a heat map associated with predicted motion of an object and may provide such a heat map to the planning component 330. In other examples, the prediction component 328 may provide data regarding an object to other components of the autonomous vehicle 102, such as the localization component 324 and/or the perception component 326. Further, in some examples, data regarding an object may be provided to the secondary system 322. In examples, data regarding an object may be stored in a primary object list.

The planning component 330 may determine a path and/or trajectory for the autonomous vehicle to follow to traverse through an environment. For example, the planning component 330 may determine various routes and/or trajectories and various levels of detail. For example, the planning component 330 may determine a route to travel from a first location (e.g., a current location) to a second location (e.g., a target location). In examples, a route may be a sequence of waypoints for travelling between two locations. As non-limiting examples, waypoints include streets, intersections, global positioning system (GPS) coordinates, etc. Further, the planning component 330 may generate an instruction for guiding the autonomous vehicle along at least a portion of the route from the first location to the second location. In at least one example, the planning component 330 may determine how to guide the autonomous vehicle from a first waypoint in the sequence of waypoints to a second waypoint in the sequence of waypoints. In some examples, the instruction may comprise a trajectory, or a portion of a trajectory.

In examples, the planning component 330 may generate the one or more trajectories 118 and/or send the one or more trajectories to the secondary system 322. For example, the planning component 330 may substantially simultaneously (e.g., within technical tolerances) generate multiple trajectories in accordance with a receding horizon technique and/or based at least in part on data received from the other components of the primary system 320. In some instances, the planning component 330 may conduct a cost-based search (or any other suitable algorithm for identifying a suitable trajectory for controlling motion of the autonomous vehicle 102) over the multiple trajectories to identify the one or more trajectories 118 to transmit to the secondary system 322.

In examples of the present disclosure, the simulation scenarios 312 may include simulated vehicle control data that is configured to be received and/or processed by any or all of the localization component 324, the perception component 326, the prediction component 328, and/or the planning component 330. For instance, the simulated vehicle control data may include simulated sensor data about a simulated environment, which may data may be processed in accordance with the techniques and functions just described. In other examples, the simulated vehicle control data may be in the form of data output by one or more of the localization component 324, the perception component 326, the prediction component 328, and/or the planning component 330. For instance, the simulated vehicle control data may include one or more of localization data, perception data, and/or prediction data. Moreover, in some instances, the simulated vehicle control data may be the one or more trajectories 118.

Although the localization component 324, the perception component 326, and the prediction component 328 are discussed in many examples as providing outputs to each other (or other components of the primary system 320), any of these components may provide output to the secondary system 322, in some examples. As a non-limiting example, the primary system 320 may provide object track information to the secondary system 322.

As illustrated, the secondary system 322 includes a localizer 332, a perceiver 334 (sometimes referred to as the perception/prediction component 334), a collision detection component 336, and a control generation component 338. In examples, the localizer 332, the perceiver 334, the collision detection component 3436, and/or the control generation component 338 may implement a model that is based on positioning, velocity, acceleration, etc. of the autonomous vehicle 102 and/or objects around the vehicle. In some examples, such models may incorporate probabilistic models. For example, the secondary system 322 may implement a Kalman filter (also referred to as linear quadratic estimation (LQE)) (e.g., an extended Kalman filter (EKF), an unscented Kalman filter (UKF), etc.), a particle filter, a Bayesian filter, and so on. To illustrate, the perceiver 334 may implement a Kalman filter or particle filter in order to associate sensor data with previous data for detection, tracking, prediction, etc. In some examples, the secondary system 322, in contrast to the primary system 320, may be configured in such a way to exclude the use of machine learned models or to reduce the number of machine learned models. In other examples, the secondary system 322 may include one or more machine learned models different than (or similar to or identical to) those of the primary system 320 (e.g., having different internal network architectures, yet yielding similar outputs based on similar inputs). In some examples, the secondary system 322 may use different hardware (e.g., processors and memory) than the primary system 320.

In examples, the secondary system 322 may be designed to be less computationally burdensome and/or operate at a higher integrity level. For example, a processing pipeline of the secondary system 322 may be simpler by relying on less sensor data, including less complex pipeline components, including less pipeline components overall, outputting less data, and/or excluding and/or limiting the use of machine learned models. In some instances, the secondary system 322 may be a "high-integrity" system by achieving stringent operating tolerances and/or have the ability to be inspected (verified). In examples, the secondary system 322 may have a higher level of reliability and/or verifiability than the primary system 320. For example, output of a sub-component of the secondary system 322 may be certified to operate with complete accuracy or near-complete accuracy (e.g., 99.99% of scenarios, or higher). In some examples, the secondary system 322 may comprise an Automotive Safety Integrity Level (ASIL) D certification.

The localizer 332 may process sensor data to determine one or more of a position and/or orientation (together a pose) of the autonomous vehicle. Here, the position and/or orientation may be relative to point(s) and/or object(s) in an environment in which the autonomous vehicle is located. In examples, the orientation may include an indication of a yaw, roll, and/or pitch of the autonomous vehicle relative to a reference plane and/or relative to point(s) and/or object(s). In examples, the localizer 332 may perform less processing than the localization component 324 of the primary system 320 (e.g., higher-level localization). For instance, the localizer 332 may not determine a pose of the autonomous vehicle 102 relative to a map, but merely determine a pose of the autonomous vehicle 102 relative to objects and/or surfaces that are detected around the autonomous vehicle 102 (e.g., a local position and not a global position) and/or to a previous pose of the autonomous vehicle 102. Such a position and/or orientation may be determined, for example, using probabilistic filtering techniques, such as, for example, Bayesian filters (Kalman filters, extended Kalman filters, unscented Kalman filters, etc.) using some or all of the sensor data.

The perceiver 334 may include functionality to perform object detection, object segmentation, object classification, track determination, and/or predicting one or more trajectories for each object (including uncertainties, for example), etc. In some examples, the perceiver 334 may receive, as input data, sensor data from one or more of the sensor(s) 104, a pose of the autonomous vehicle from the localizer 332, data indicating a direction of motion of the autonomous vehicle, data indicating a velocity of the autonomous vehicle, data indicating an acceleration of the autonomous vehicle, data indicating a yaw rate of the autonomous vehicle, data indicating a yaw acceleration, and/or data indicating a steering angle and/or steering angle rate of the autonomous vehicle. Further, in some examples, the perceiver 334 may receive, as input data, data from the primary system 320, such as a primary object list from the perception component 326, a pose of the autonomous vehicle, one or more object tracks as determined by the primary system 320, etc. As noted above, the object list from the primary system 320 may include primary perception data, processed sensor data, data regarding a track/trajectory of an object, etc. In such an example, the perceiver 334 may perform data association (e.g., by using probabilistic filters, clustering, nearest point analysis, or the like) to associate sensor data with a track.

The perceiver 334 may process the input data to determine secondary perception data. The secondary perception data may indicate a presence of an object that is proximate to the autonomous vehicle, one or more characteristics associated with the object, and so on. For example, the perceiver 334 may receive the simulated object data and determine the characteristic(s) from the simulated object data. For example, characteristic(s) associated with an object may include a position of the object relative to the autonomous vehicle, an orientation of the object relative to the autonomous vehicle, a velocity of the object, an acceleration of the object, an extent of the object (a size of the object), etc. In many examples, a characteristic included in the secondary perception data does not include a classification of an object (e.g., semantic label). Although in some examples, the secondary perception data may indicate a classification.

The perceiver 334 may also process the input data to determine one or more tracks for an object. As noted above, a track of an object may comprise historical position, velocity, acceleration, and/or orientation, extents, and the like and/or uncertainties associated therewith. In one example, the perceiver 334 may implement a Kalman filter for data association and/or use of features in the data (e.g., unique/salient points of data, such as unique pixels) to associate a new detection with a previously detected object. In another example, the perceiver 334 may determine an object in an environment at a first time, determine an object in an environment at a second time, determine an overlap of the objects at the first time and second time, and generate a track for the object. In yet another example, the perceiver 334 may determine a velocity of an object at a first time, compare a predicted motion of the object with captured data of the object at a second time, determine an overlap, and generate a track for the object. The perceiver 334 may determine a track for one or more objects detected around the autonomous vehicle. In some examples, the perceiver 334 may determine a track of an object independently from data received from the primary system 320 (e.g., will not use a primary object list and/or a pose of the autonomous vehicle 102 received from the primary system 320). While in other examples, the perceiver 334 may use data received from the primary system 320.

The perceiver 334 may also process the input data to determine one or more predicted trajectories for an object. For example, based on a current position of an object and a velocity of the object over a period of a few seconds, the perceiver 334 may predict a path that the object will move over the next few seconds. In some examples, such a predicted path may comprise using linear assumptions of motion given a position, orientation, velocity, and/or orientation, such as using a straight-line approximation and/or fit to higher order models. In other examples, such predicted paths may comprise more complex analyses, such as using an extended Kalman filter (EKF) propagation, models of object behavior, or other prediction techniques.

The perceiver 334 may output the secondary perception data and/or data regarding an object (e.g., a track, trajectory, etc.) to any component of the secondary system 322. In examples, the secondary perception data and/or data of an object are represented in a secondary object list. For instance, the object list may indicate, for each object, a characteristic(s) of the object and/or a track/trajectory of the object. In examples, the perceiver 334 may output the secondary perception data and/or data regarding an object to the primary system 320.

For ease of illustration the perceiver 334 (and other components of the primary system 320 and the secondary system 322) is illustrated with a single block. However, the perceiver 334 (and/or other components of the primary system 320 and the secondary system 322) may be implemented as any number of blocks, each block located in one or more system or subsystem.

In the context of this disclosure, the simulated vehicle data of the simulation scenarios 312 may replicate raw data, e.g., sensor data received by the components of the primary system 320 and/or any data received, generated and/or output by any of the localization component 324, the perception component 326, the prediction component 328, and/or the planning component 330. Moreover, the simulated object data may replicate raw data, e.g., sensor data, or may replicate data generated by any one or more of the localizer 332, and/or the perceiver 334. Accordingly, in examples, the simulation scenarios 312 may cause as many or as few of the components of the vehicle control system 304 to perform their respective functions.

The collision detection component 336 may evaluate trajectories, e.g., trajectories generated by the planning component 330, to detect a potential collision. For example, the collision detection component 336 may determine if the trajectory generated in response to the simulated vehicle control data intersects with (or comes within a threshold distance of) a predicted trajectory of object (e.g., determined by the perceiver 334) simulated via the simulated object data. As noted above, the simulation scenarios may be intended to create situations in which a collision will occur.

The collision detection component 336 may determine if a predicted object trajectory and a vehicle trajectory intersect and/or come within a threshold distance of each other (e.g., a location of proximity), determining if an object along the predicted object trajectory and the vehicle along the vehicle trajectory would meet at any intersection or location of proximity at the same time or a window of time and/or within a threshold distance of one another, and/or determining if a bounding box for the object overlaps with a bounding box for the autonomous vehicle around any intersection or location of proximity and/or within a threshold distance from one another. Further, in examples, the same process may be performed with a safety margin around each bounding box (e.g., a safety bounding box that represents a bounding box that has been enlarged by a particular amount, such as by adjusting a length/width/height of a bounding box). A bounding box may represent a spatial location, orientation, and/or size (e.g., extents) of an object. For example, a bounding box may be a representation of an object defined by eight corners (e.g., a cuboid) and having a position, orientation, length, width, and/or height. In examples, a bounding box may be a minimum volume cuboid which encompasses an object.

The collision detection component 336 may provide data to the control generation component 338, e.g., indicating a detection of a collision. In response, the control generation component 338 can generate one or more controls for responding to the collision. For instance, the control generation component 338 can generate a collision avoidance trajectory that causes the autonomous vehicle 102 to decelerate to a stop in an attempt to avoid or mitigate a potential collision. For example, the collision avoidance trajectory may include a deceleration along the current path of travel. In examples, a maximum deceleration trajectory (also referred to as a hard stop or emergency stop) may include braking at a particular rate, such as a predetermined rate, a rate that is greater than a threshold (e.g., a maximum braking rate), a rate from among a plurality of available rates that is a greatest rate, and so on. In one example, a maximum deceleration trajectory may include decelerating at a rate of 15 or 20 feet per second per second until the autonomous vehicle 102 comes to a stop.

In other examples, the collision avoidance trajectory can include a steering maneuver, e.g., that causes the vehicle to swerve to avoid the collision. In some examples, the collision avoidance trajectory may comprise a perturbation of a current trajectory (e.g., changes in any one or more of the desired vehicle states and/or associated controls) in order to mitigate any potential collisions. The control generation component 338 may generate the collision avoidance trajectory based on information about the pose of the autonomous vehicle (e.g., provided by the localizer 332), information about an object(s) (e.g., track or trajectory information provided by the perceiver 334), information provided by the primary system 320, and/or any other information available to the secondary system 322.

Also in examples, the collision detection component 336 can determine other actions, e.g., in addition to or instead of the collision avoidance trajectory, for the vehicle. For instance, the control generation component 338 may generate one or more signals that cause the vehicle to prepare the vehicle for a collision, such as preparing and/or deploying airbags, tensioning seat belts, or the like. Controls generated by the control generation component 338 can be output to controllers of the vehicle, e.g., to implement a collision avoidance maneuver.

In examples, if the output trajectory is associated with a deceleration, the trajectory selector may send a signal to another component of the autonomous vehicle 102 to prepare for such deceleration. For example, if the maximum deceleration trajectory is selected due to a likely collision, the trajectory selector may output a signal to warn other components, so that the other components may prepare for a collision (e.g., pre-tensioning seat belts, preparing air bags for deployment, etc.).

The components of the primary system 320 and/or the secondary system 322 may represent hardware and/or software components. In the context of software, one or more of the components may include instructions that are executable by one or more processors. In context of hardware, one or more of the components may be implemented as integrated circuits (e.g., application-specific integrated circuits (ASICs), etc.), gate arrays (e.g., field-programmable gate arrays (FPGAs), etc.), and so on. In at least some examples, both hardware and software of the primary system 320 and the secondary system 322 may differ.

Figure 4:
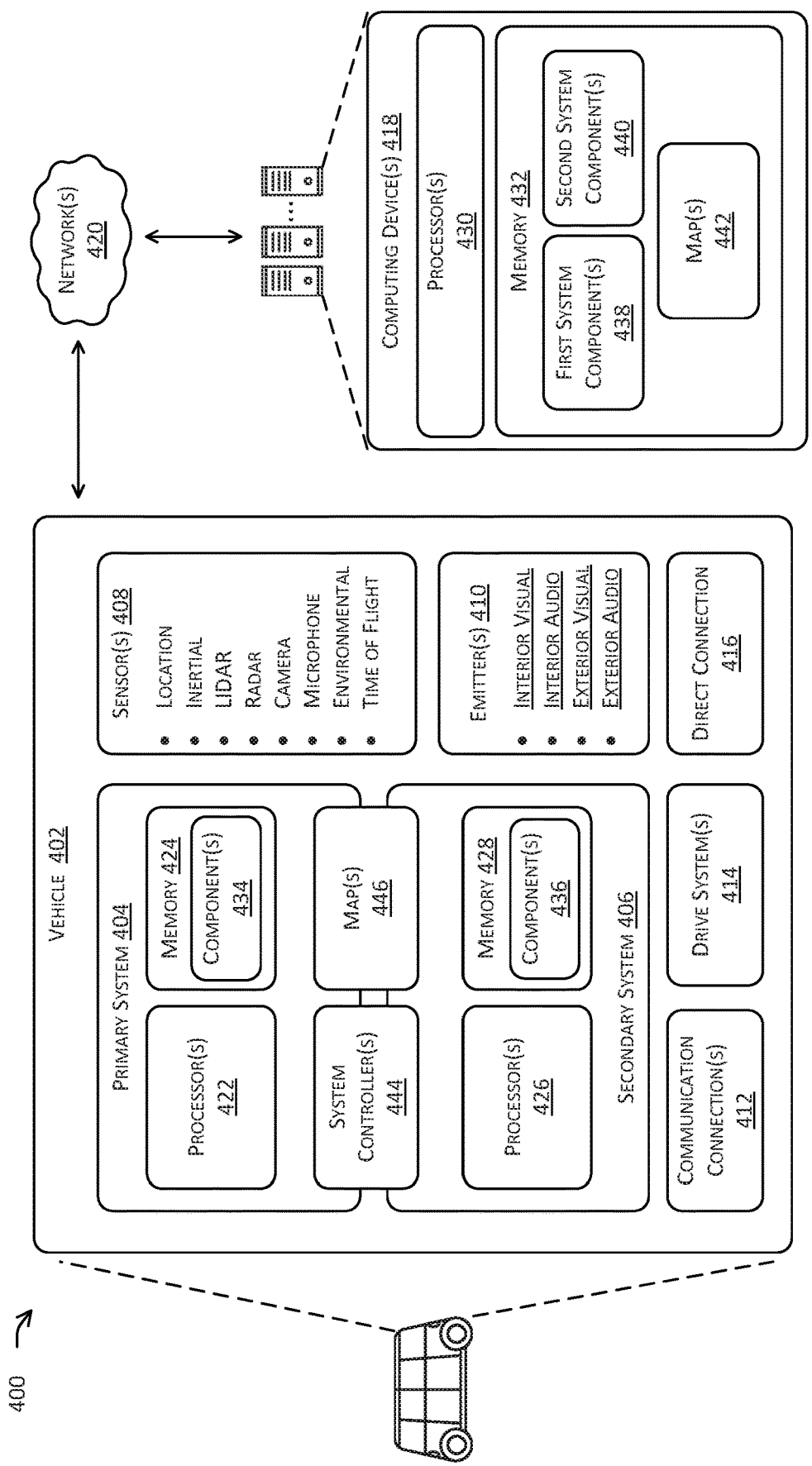
FIG. 4 includes a block diagram illustrating an example vehicle architecture for implementing collision avoidance system testing techniques, as described herein.

FIG. 4 depicts a block diagram of an example system 400 for implementing the techniques described herein. In some instances, the system 400 may include a vehicle 402, which may correspond to the autonomous vehicle 102 in FIG. 1. In some instances, the vehicle 402 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 402 may be a fully or partially autonomous vehicle having any other level or classification. Moreover, in some instances, the techniques described herein may be usable by non-autonomous vehicles as well. In addition, while implementations described herein may include simulating a control system of an autonomous vehicle, semi-autonomous vehicle, or a non-autonomous vehicle, like the vehicle 402, some of the techniques may be in a simulated environment, using a simulated vehicle.

The vehicle 402 may include a first system 404 (e.g., a first computing device), a second system 406 (e.g., a second computing device), one or more sensors 408, one or more emitters 410, one or more communication connections 412, one or more drive systems 414, and/or a direct connection 416 (e.g., for physically coupling the vehicle 402 to exchange data and/or to provide power).

In some instances, the sensor(s) 408 may include light detection and ranging (LIDAR) sensors, RADAR sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), cameras (e.g., red-green-blue (RGB), infrared (IR), intensity, depth, time of flight, etc.), microphones, wheel encoders, environment sensors (e.g., temperature sensors, humidity sensors, light sensors, pressure sensors, etc.), etc. The sensor(s) 408 may include multiple instances of each of these or other types of sensors. For instance, the LIDAR sensors may include individual LIDAR sensors located at the corners, front, back, sides, and/or top of the vehicle 402. As another example, the cameras may include multiple cameras disposed at various locations about the exterior and/or interior of the vehicle 402. The sensor(s) 408 may provide input to the first system 404 and/or the second system 406.

The vehicle 402 may also include the emitter(s) 410 for emitting light and/or sound, as described above. The emitter(s) 410 in this example may include interior audio and visual emitter(s) to communicate with passengers of the vehicle 402. By way of example and not limitation, interior emitter(s) may include speakers, lights, signs, display screens, touch screens, haptic emitter(s)(e.g., vibration and/or force feedback), mechanical actuators (e.g., seatbelt tensioners, seat positioners, headrest positioners, etc.), and the like. The emitter(s) 410 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 402 may also include the communication connection(s) 412 that enable communication between the vehicle 402 and one or more other local or remote computing device(s). For instance, the communication connection(s) 412 may facilitate communication with other local computing device(s) on the vehicle 402 and/or the drive system(s) 414. Also, the communication connection(s) 412 may additionally or alternatively allow the vehicle 402 to communicate with other nearby computing device(s) (e.g., other nearby vehicles, traffic signals, etc.). The communication connection(s) 412 may additionally or alternatively enable the vehicle 402 to communicate with a computing device 418.

The communication connection(s) 412 may include physical and/or logical interfaces for connecting the first system 404 and/or the second system 406 to another computing device or a network, such as network(s) 420. For example, the communication connection(s) 412 may enable Wi-Fi-based communication such as via frequencies defined by the IEEE 800.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the first system 404, the second system 406, and/or the sensor(s) 408 may send sensor data, via the network(s) 420, to the computing device(s) 418 at a particular frequency, after a lapse of a predetermined period of time, in near real-time, etc.

In some instances, the vehicle 402 may include the drive system(s) 414. In some instances, the vehicle 402 may have a single drive system 414. In some instances, the drive system(s) 414 may include one or more sensors to detect conditions of the drive system(s) 414 and/or the surroundings of the vehicle 402. By way of example and not limitation, the sensor(s) of the drive system(s) 414 may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, RADAR sensors, etc. Some sensors, such as the wheel encoders may be unique to the drive system(s) 414. In some cases, the sensor(s) on the drive system(s) 414 may overlap or supplement corresponding systems of the vehicle 402 (e.g., sensor(s) 408).

The drive system(s) 414 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 may include a drive system controller which may receive and preprocess data from the sensor(s) and to control operation of the various vehicle systems. In some instances, the drive system controller may include one or more processors and memory communicatively coupled with the one or more processors. The memory may store one or more modules to perform various functionalities of the drive system(s) 414. Furthermore, the drive system(s) 414 may also include one or more communication connection(s) that enable communication by the respective drive system with one or more other local or remote computing device(s).

The first system 404 may include one or more processors 422 and memory 424 communicatively coupled with the one or more processors 422. The second system 406 may include one or more processors 426 and memory 428 communicatively coupled with the one or more processors 426. The computing device(s) 418 may also include a processor(s) 430 and/or memory 432 communicatively coupled with the processor(s) 430. The processor(s) 422, 426, and/or 430 may be any suitable processor capable of executing instructions to process data and perform operations as described herein. By way of example and not limitation, the processor(s) 422, 426, and/or 430 may comprise one or more central processing units (CPUs), graphics processing units (GPUs), integrated circuits (e.g., application-specific integrated circuits (ASICs), etc.), gate arrays (e.g., field-programmable gate arrays (FPGAs), etc.), and/or any other device or portion of a device that processes electronic data to transform that electronic data into other electronic data that may be stored in registers and/or memory.

Memory 424, 428, and/or 432 may be examples of non-transitory computer-readable media. The memory 424, 428, and/or 432 may store an operating system and one or more software applications, instructions, programs, and/or data to implement the methods described herein and the functions attributed to the various systems. In various implementations, memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In examples, the memory 424 of the first system 404 may store one or more components 434. For example, the first system 404 may correspond to the primary system 42 of FIGS. 1 and 2 and store the localization component 324, the perception component 326, the prediction component 328, and/or the planning component 330. The processor(s) 422 may execute the one or more components 434 to cause the first system 404 to perform various actions discussed herein.

In examples, the memory 428 of the second system 406 may store one or more components 436. For example, the second system 406 may correspond to the secondary system 114 of FIG. 1 and store the localizer 332, the perceiver 334, the collision detection component 336, and/or the control generation component 338. The processor(s) 426 may execute the one or more components 436 to cause the second system 406 to perform various actions discussed herein.

Though depicted in FIG. 4 as residing in the memory 424 and/or the memory 428 for illustrative purposes, it is contemplated that the component(s) 434 and/or the component(s) 436 may additionally, or alternatively, be accessible to the computing device(s) 418 (e.g., stored remotely). For example, the memory 432 may store a first system component(s) 438 corresponding to at least a portion of the component(s) 434 and/or store a second system component(s) 440 corresponding to at least a portion of the component(s) 436. Additionally, or alternatively, the memory 432 may store one or more maps 442.

In at least one example, the first system 404 and/or the second system 406 may include one or more system controllers 444, which may be configured to control steering, propulsion, braking, safety, emitters, communication, and other systems of the vehicle 402. In examples, the system controller(s) 444 may be stored in the memory 424 and/or the memory 428. The system controller(s) 444 may communicate with and/or control corresponding systems of the drive system(s) 414 and/or other components of the vehicle 402. In some instances, the system controller(s) 444 may translate a trajectory generated by the first system 404, generated by the second system 406, and/or selected by the second system 406 into instructions useable by the drive system(s) 414 to cause the vehicle 402 to traverse the trajectory. In some examples, the one or more system controllers 444 may be located on a separate hardware component than the first system 404 and/or the second system 406.

In some instances, the first system 404, the second system 406, the system controller(s) 444, and/or any component thereof may process sensor data, as described above, and may send their respective outputs, over the network(s) 420, to the computing device(s) 418 (e.g., at a particular frequency, after a lapse of a predetermined period of time, in near real-time, etc.)

The first system 404 and/or the second system 406 may store one or more maps 446, which may be used by the vehicle 402 to navigate within an environment. For the purpose of this discussion, a map may be any number of data features modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some instances, the map may be stored in a tiled format, such that individual tiles of the map represent a discrete portion of an environment, and may be loaded into working memory as needed. In some instances, the map may include an occupancy grid, point map, landmark map, and/or graph of pose constraints. In some instances, the vehicle 402 may be controlled based at least in part on the map(s) 446. That is, the map(s) 446 may be used in conjunction with a localization component of the first system 404 (and/or a localization component of the second system 406 in some examples) to determine a location of the vehicle 402, identify objects in an environment, and/or generate routes and/or trajectories to navigate within an environment.

In some instances, aspects of some or all of the components discussed herein may include any models, algorithms, and/or machine learning algorithms. For example, the component(s) 434 in the memory 424, the component(s) 436 in the memory 428, and/or the component(s) in the memory 432 may be implemented as a neural network.

It should be noted that while FIG. 4 is illustrated as a distributed system, in alternative examples, components of the vehicle 402 may be associated with the computing device(s) 418 and/or components of the computing device(s) 418 may be associated with the vehicle 402. That is, the vehicle 402 may perform one or more of the functions associated with the computing device(s) 418, and vice versa.

In some examples, the one or more components 436 (and/or the one or more components 434) include an estimation and validation component to determine a direction of motion of the vehicle 402, a velocity of the vehicle 402, an acceleration of the vehicle 402, a yaw rate of the vehicle 402, a yaw acceleration, and/or a steering angle of the vehicle 402. In examples, such information may be based on signals from the system controller(s) 444, the drive system(s) 414, etc. The estimation and validation component may generate data indicating one or more of such information and provide the data to various components of the second system 406 and/or the first system 404.

Further, in some examples, the one or more components 436 (and/or the one or more components 434) may include a data processing component(s) to filter sensor data to generate a reduced amount of data. In one example, the data processing component(s) may remove data from the sensor data that is outside a particular range. This may be based on a velocity or acceleration of the vehicle 402, a track of an object, a velocity or acceleration of an object, etc. (e.g., remove a substantial amount of data when traveling relatively slow and remove less data when traveling relatively fast). To illustrate, if the vehicle 402 is traveling at 15 miles per hour, and no vehicles are traveling towards the autonomous vehicle 102, the data processing component(s) may remove data that is 200 feet away, since this data is likely not needed to evaluate a trajectory or identify a potential imminent collision. In another example, the data processing component(s) may remove data from the sensor data based on a type of environment in which the vehicle 402 is located. For example, if the vehicle 402 is in an urban area with multiple vehicles, roads, road intersections, etc., the data processing component(s) may not remove data from the sensor data (or remove a limited amount). However, if the vehicle 402 is in a rural area or sparse region of an urban environment with relatively few vehicles, roads, road intersections, etc., the data processing component(s) may remove more data from the sensor data. In examples, reducing the amount of the sensor data may allow the second system 406 that may process the reduced sensor data to operate more quickly (e.g., process less data, resulting in reduced compute time).

Figure 5:
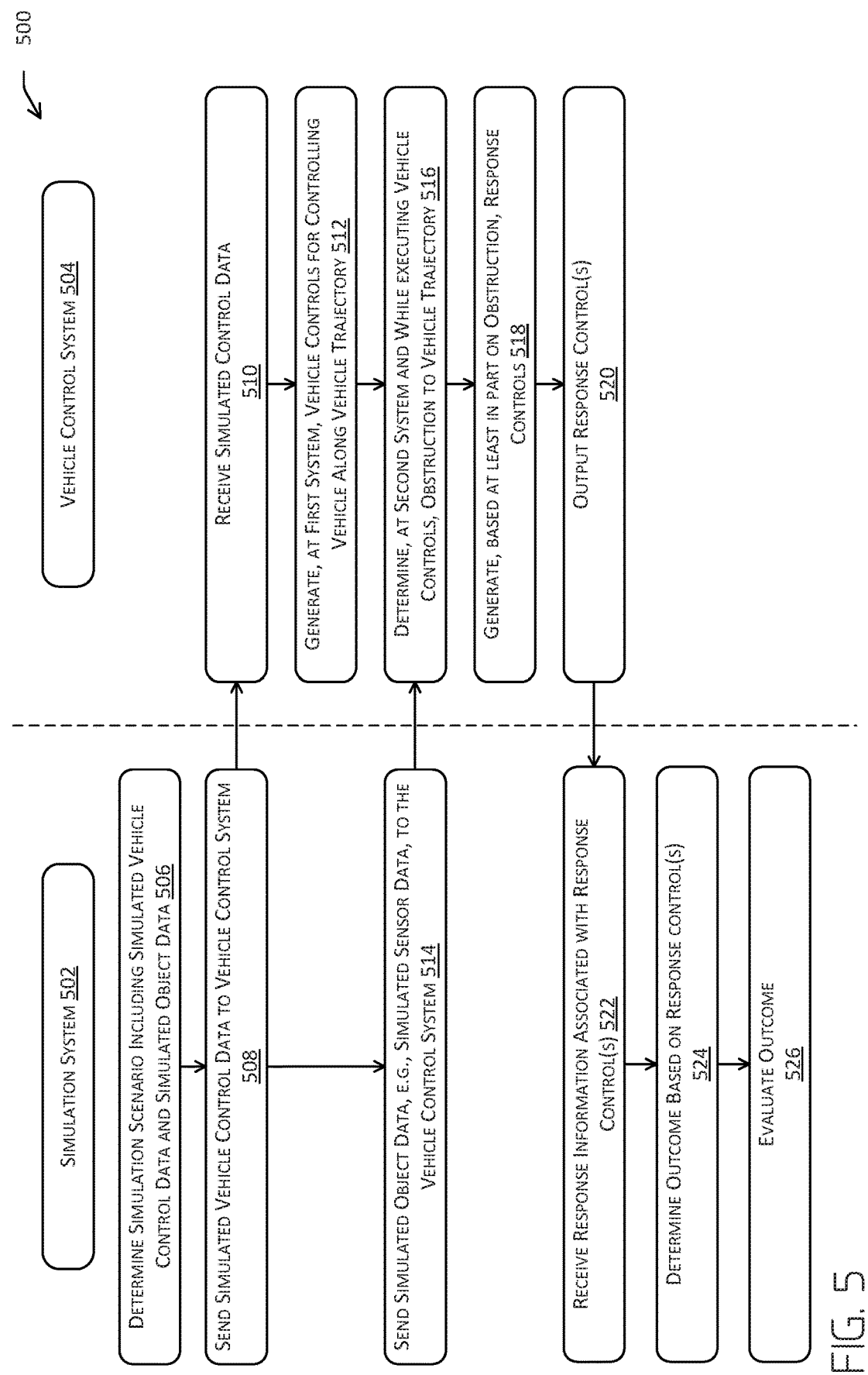
FIG. 5 illustrates an example process for testing responses of a collision avoidance system, as described herein.
Figure 6:
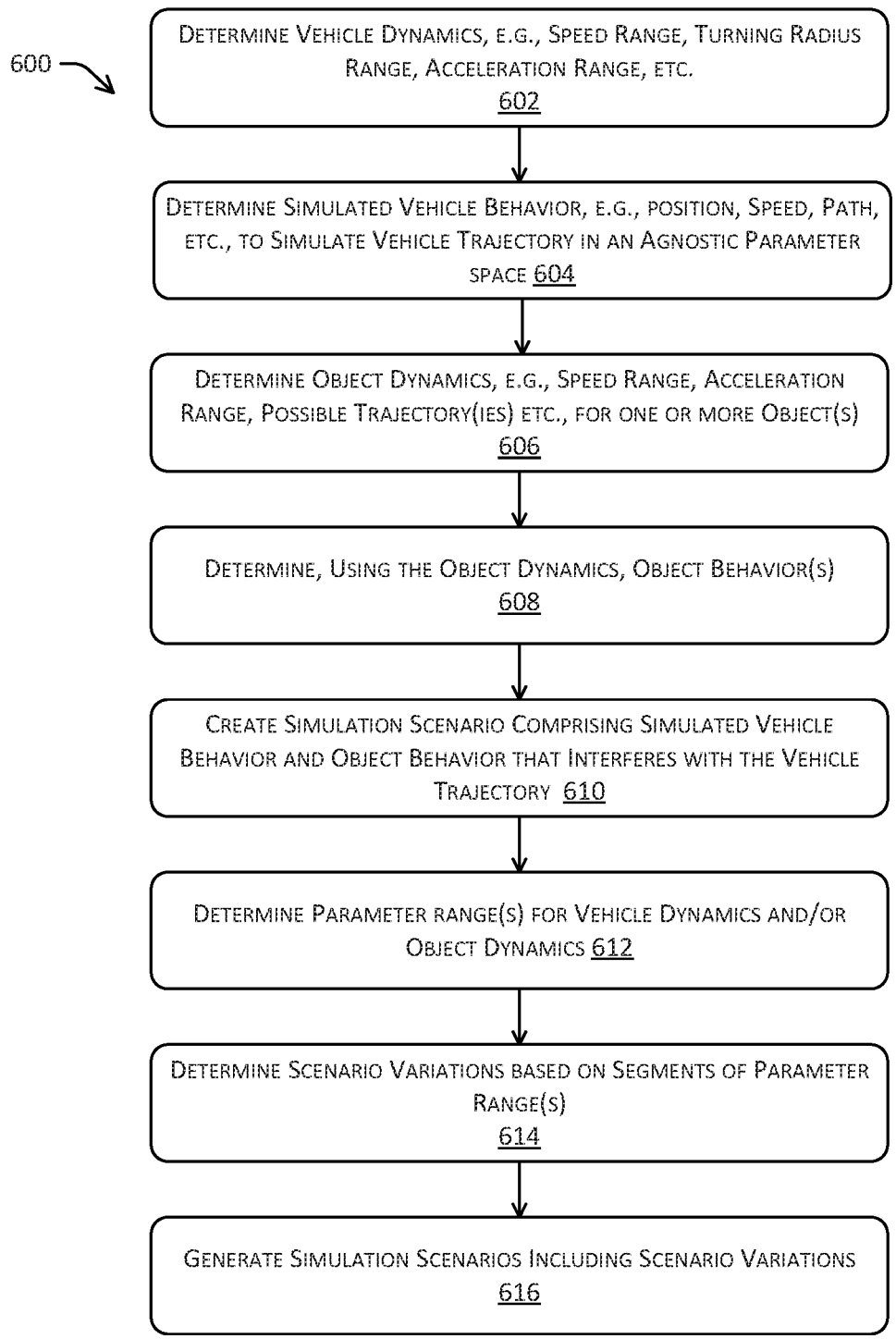
FIG. 6 illustrates an example process for generating simulation scenarios for collision avoidance system testing techniques, as described herein.

FIGS. 5 and 6 illustrate example processes 500, 600 to perform the techniques discussed herein. The processes 500, 600 are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, the processes 500, 600 may be performed by any device or component, such as the simulation systems, vehicle control devices and/or autonomous vehicles 102, a service provider (e.g., a computing device of a service provider), or any other device.

FIG. 5 illustrates an example process 500 for using a simulation system 502 to test a vehicle control system 504

(which may be simulated). For example, the simulation system 502 may be the same as the simulation system 126 and/or the simulation system 302. The vehicle control system may be the same as the vehicle control system 304 and/or perform some or all of the functioning of the vehicle 102 and/or the vehicle 402, or otherwise represent a simulated version thereof (having similar and/or the same hardware).

At operation 506, the simulation system 502 may determine a simulation scenario including simulated vehicle control data and simulated object data. For example, the simulation system 502 may select a set of simulation scenarios that are configured to test collision avoidance responses of the vehicle control system 504. In examples, each simulation scenario can include simulated vehicle control data and simulated object data that are purposefully antagonistic, that is, the data purposefully results in a perceived collision or potential collision of the vehicle with an object.

In some examples, the vehicle control system 504 may include a primary system that receives the simulated vehicle control data and determines a vehicle trajectory along which the vehicle associated with vehicle control system 504 should proceed. In examples, the simulated vehicle control data can be simulated sensor data that causes the vehicle to proceed through a simulated environment. In other examples, the simulated vehicle control data can include a state of a vehicle or other vehicle parameters, e.g., acceleration, velocity, path, or the like. In still further examples, the simulated vehicle control data may be a starting location (e.g., a coordinate in an environment) and one or more waypoints to which the vehicle is to travel. Moreover, the simulated vehicle control data can be a trajectory of the vehicle. For example, the vehicle control data can be any information that causes the vehicle to control the vehicle to take some course of action. Also in some examples, the vehicle control system 504 can include a secondary system that senses objects in the environment and determines whether a trajectory of the vehicle and a trajectory of one of the objects will result in a collision. The simulated object data may be data that causes the secondary system to determine such a collision. In some examples, the simulated object data can be simulated sensor data, e.g., simulated LIDAR, radar, time-of-flight, or other data, as well as any other representation of an object (e.g., bounding box, segmentation, track, predicted trajectory, etc.).

At operation 508, the simulation system 502 can send the simulated vehicle control data to the vehicle control system 504, and at operation 510, the vehicle control system 504 can receive the simulated control data. The simulation system 502 can specifically send the vehicle control data to a primary system of the vehicle control system 504 or the simulation system can merely transmit or otherwise provide the simulated vehicle control data to the vehicle control system 504.

At operation 512, the vehicle control system 504 can generate, at a first system, vehicle controls for controlling the vehicle along a vehicle trajectory. For example, and as described herein, the vehicle control system 504 may include a first, or primary, system that controls normal driving functions. At operation 512, the vehicle control data provided by the simulation system 502 may be processed by the primary system such that the vehicle control system 504 determines a state or trajectory for a vehicle associated with the vehicle control system 504 (e.g., a simulated vehicle). During operation of an actual vehicle, the vehicle control system 504 the vehicle controls generated by the vehicle control system may be executed by the vehicle, e.g., by changing a steering angle, accelerating, decelerating, or the like. In some instances, the operation 514 may be optional. For example, in some instances, the simulated vehicle control data can include the vehicle controls necessary to control the simulated vehicle along a simulated trajectory.

At operation 514, the simulation system 502 can send the simulated object data to the vehicle control system 504. As noted above, in some examples, the simulated object data may be simulated sensor data that will cause the vehicle control system 504 to identify an object to which the simulated vehicle should react, e.g., to avoid a collision, or any other higher level representation of the one or more objects. In some examples, the simulated object data may be provided directly to a secondary system, e.g., a collision avoidance system, of the vehicle control system 504, thereby bypassing the primary system, and/or may be provided generally to the vehicle control system 504 (e.g., one or more of the primary and/or secondary systems substantially simultaneously). In some examples, the simulated object data may simulate data from fewer than all sensors on an autonomous vehicle. For instance, the simulated object data may simulate sensor data from fewer than all sensor modalities, e.g., only LIDAR data, only radar data, only LIDAR data and radar data, but not time-of-flight data, and so forth. In other examples, the simulated object data may simulate data from fewer than all sensors of the same modality. For instance, the simulated object data may be configured to simulate a malfunctioning sensor and can include only noise (or no data at all) associated with that simulated data for that sensor.

At operation 516, the vehicle control system 504 can determine, at a second system and while executing the vehicle controls, an obstruction to the vehicle trajectory. For example, a collision detection component of a secondary system (as described herein) may receive the simulated object data and determine a collision is likely above a certain threshold, e.g., that the collision is imminent. In techniques described herein, the simulated object data is specifically configured to result in a simulated collision, absent some intervention.

At operation 518, the vehicle control system 504 can generate, based at least in part on the obstruction, one or more response control(s). For example, the secondary system of the vehicle control system 504, e.g., in response to determining an imminent collision may generate one or more response controls to override the vehicle controls generated in response to the simulated vehicle control data. In some examples, the response controls can be one or more of controls to perform a hard stop, e.g., a maximum deceleration of the vehicle to a stop, controls to perform a steering maneuver, e.g., to swerve or otherwise change the direction of travel, controls to deploy one or more safety systems, e.g., to tension seatbelts, deploy restraints, or the like, or other responsive controls intended to control one or more aspects of a vehicle in response to the collision detection. In still further examples, the response control(s) generated at the operation 518 can be control(s) associated with a second trajectory. i.e., different from the vehicle trajectory, generated by the first system. For instance, the first system can generate multiple trajectories including a "safe" or "emergency" trajectory, and provide such trajectories to the secondary system in addition to the vehicle trajectory.

At operation 520, the vehicle control system 502 can output the response control(s). For example, in an actual vehicle, the response control(s) may be provided to one or more system controllers configured to execute the response control(s).

At operation 522, the simulation system can receive response information associated with the response control(s). For example, in the simulated environment of the method 500, the response control(s) may be received at the simulation system 502, e.g., to analyze the response of the vehicle control system 504. Alternatively, the response information can be received as data from a system controller, e.g., that processes and/or executes the response control(s), or from some other component.

At operation 524, the simulation system 502 can determine an outcome based on the response control(s). For example, the simulation system 502 can model or otherwise simulate an outcome assuming the response control(s) are executed by the vehicle. In some examples, the simulation system 502 can determine a response trajectory resulting from execution of the response control(s) and compare the response trajectory to the object position or object trajectory. For example, the simulation system 502 can determine whether the response control(s) will result in avoidance of a collision and/or additional parameters associated with such an avoidance (whether components operated within tolerances, spatial and temporal proximity to one or more objects, passenger comfort levels (jerk, acceleration, etc.), and the like). If a collision is not avoided, the simulation system 502 can also determine details of a simulated collision, including but not limited to a speed of the simulate vehicle at impact, a location of the impact on the simulated vehicle, or the like.

At operation 526, the simulation system 502 can evaluate the outcome. For example, the simulation system 502 can compare the outcome to an expected or required outcome. By way of non-limiting example, the simulation scenarios may be derived based at least in part on standards for vehicle response, e.g., for autonomous vehicle response, and the outcome may be compared to such standards. Thus, for example, because the simulation system can be used with many different vehicle control systems in some examples, those different control systems can be tested against the same scenarios, e.g., for safety rating purposes. Such safety rating may provide an indication under which environments the vehicle is capable of safely operating, and/or otherwise indicate one or more components, algorithms, etc. which may be identified for improvement. In some examples, the operation 526 may also determine one or more operational parameters defining the environments under which the vehicle is cable of safely operating. Such operational parameters may define a maximum speed, a maximum acceleration, a minimum and/or maximum turning radius, a minimum distance from a nearby object, or the like. Also in example, the operational parameters may be provided to an autonomous vehicle, and the autonomous vehicle may be controlled according to the operational parameters.

As will be appreciated, the techniques of the process 500 can allow for simulating of scenarios that may be unlikely to be encountered in actual driving and/or that are difficult to replicate. While many of the examples relate to scenarios in which a vehicle control system reacts to another object in an environment of the (simulated) vehicle, other scenarios also are contemplated. For instance, errors, malfunctions, and/or other unlikely scenarios at the vehicle can also be simulated using the techniques described herein. For instance, the simulation scenarios may also, or alternatively, include simulated data that simulates a fault or anomalous result at the primary system or the secondary system. By way of non-limiting example, the simulation scenario can include an (excessive) amount of data that causes the vehicle control system to experience decreased processing capability. In other examples, the simulated data may simulate one or more of the vehicle control subsystems going offline or becoming ineffective. Examples of a malfunctioning sensor are described herein, but the simulation data may be configured such that any one or more of the components and/or aspects of the vehicle control system are malfunctioning.

FIG. 6 illustrates an example process 600 to generate discrete simulation scenarios. For example, the process 600 may be used to generate the simulation scenarios used in the process 500, although the process 500 can utilize simulation scenarios other than those generated in accordance with FIG. 6, and the simulation scenarios generated by the process 600 may be used in processes and systems other than those depicted in FIG. 5.

At operation 602, the process 600 can include determining vehicle dynamics. For example, the process 600 can determine a speed range at which the vehicle can travel, a range of turning radii of which the vehicle is capable, an acceleration and/or deceleration range, a range of masses (e.g., based on a number and size of passengers) for the vehicle, or the like. In some examples, the speed range may be determined based on the physical capabilities of the vehicle, e.g., a top speed for the vehicle, or may be determined based on a specific environment. For example, although a vehicle may be capable of going 200 mph, in some locales, e.g., a city, the vehicle will never reach 200 mph, so some lower speed may be used as an upper parameter for the vehicle speed. Similarly, a maximum deceleration may be a theoretical maximum deceleration, e.g., based on optimum break functioning, or may be some lower deceleration, e.g., to account for increased mass from passengers and/or cargo in the vehicle, to account for reduced breaking functionality from normal break wear, to account for changes in gradient, e.g., a decline, which may be a maximum decline within a region, to account for poor weather conditions and/or road conditions, e.g., slick roads, or the like. Other parameters and/or attributes may also be used to determine the vehicle dynamics.

At operation 604, the process 600 can include determining a simulated vehicle behavior to simulate a vehicle trajectory in an agnostic parameter space. For example, a scenario generation component may determine a point (x, y) in a two-dimensional agnostic parameter space as a starting point for a simulated vehicle in a simulation and ascribe a trajectory (e.g., a path having a series of controls and/or positions, velocities, accelerations, etc. associated therewith), that simulates actual driving. For example, the simulated vehicle behavior may include ascribing one or more states to the vehicle at the starting point, e.g., a constant velocity, a constant acceleration, or the like. In other instances, the simulated vehicle behavior may include an identification of waypoints (e.g., x, y coordinates) to which the vehicle is to travel from an origination point.

At operation 606, the process 600 can include determining object dynamics for one or more objects. For example, the process 600 can determine extents of objects that may be encountered by the vehicle, one or more speed ranges for those objects, one or more classifications of the objects, one or more acceleration ranges for those objects, one or more trajectories for the objects, or the like. In some examples, certain objects may have different dynamics. By way of non-limiting examples, an object that simulates a vehicle may have dynamics, e.g., size, turning radius, acceleration/deceleration, speed, that are different from those for an object that simulates a person. In some examples, the object dynamics can be determined based on models of object behaviors. For instance, such models may be generated from driving data, empirical studies, or otherwise.

At operation 608, the process 600 can determine, using the object dynamics, one or more object behaviors. For example, object behaviors can include a position of the object (e.g., relative to the vehicle and in the agnostic parameter space), a trajectory of the object, a speed of the object, an acceleration or deceleration of the object, or the like. The object behaviors may be limited to the object dynamics. By way of non-limiting example, an object the size of a bus and travelling along a straight-line trajectory cannot immediately change to a second straight-line trajectory perpendicular to the first.

At operation 610, the process 600 can include creating a simulation scenario comprising simulated vehicle behavior and an object behavior that interferes with the vehicle trajectory. For example, a simulation scenario generator can determine antagonistic vehicle and object behaviors that will result in a collision in the agnostic parameter space. In a simple example, a simulation scenario can be created that includes a vehicle behavior that causes a vehicle to travel from point A to point B and that includes a simulated object at point B, travelling toward point A.

At operation 612, the process 600 can include determining one or more parameter ranges for the vehicle dynamics and/or the object dynamics. For example, and using the example in which the vehicle is travelling from point A to point B, and the object from point B to point A, the vehicle may be travelling at a range of speeds from a minimum speed to a maximum speed. Moreover, the vehicle may be accelerating within some range of accelerations or decelerating within some range of decelerations. Similarly, the object may have a speed (or may be stationary) within some range of speeds, may be accelerating, decelerating, and/or changing direction according to the dynamics of the object. In some examples, parameter ranges associated with the object may also include a temporal component. For instance, the vehicle behavior may specify that the vehicle travel from point A to point B in 2 seconds and the object behavior may be such that the object is at point B at t=1 second (or 0.5 seconds, 1.5 seconds, or some other time). For example, such a scenario could replicate a real-world scenario in which an object is blocked from view, e.g., in the instance of a pedestrian stepping out from behind a parked car.

At operation 614, the process 600 can determine scenario variations based on segments of the parameter ranges. For example, and again using the simple example, a first scenario variation may have the vehicle moving from point A to point B at a maximum vehicle speed (e.g., 60 mph) and the object moving from point B to point A at a maximum object speed. A second scenario variation, then, may have the vehicle moving at different vehicle speed (e.g., 58 mph) and the object moving at the same, maximum object speed. A third scenario could vary the vehicle speed even more (e.g., 56 mph). Still further scenario variations may vary the object speed at discrete increments. Other parameters, e.g., acceleration, deceleration, direction, can also be incrementally varied to derive additional scenario variations.

At operation 616, the process 600 can include generating simulation scenarios including the scenario variations. For example, the simulation scenarios can include any number of scenario variations, including the scenario variations that are the most antagonistic. However, the simulation scenarios may not include every combination including every iteration. Continuing with the example above, the simulation scenarios may include only vehicle velocities at 56 mph, 58 mph, and 60 mph, but not for speeds below 56 mph. In other examples, the simulation scenarios may be chosen based on some vehicle performance requirements. Thus, while it may be of interest to know how the vehicle control system performs when the vehicle is moving at or near top speed, the vehicle may be required to avoid a collision only at 40 mph relative to the object. Thus, for example, scenario variations that simulate this requirement (and/or that are near the requirement) may be included in the simulation scenarios. Other factors may also be used to limit the near-infinite combinations.

EXAMPLE CLAUSES

A. A system comprising: one or more processors; and one or more computer-readable media storing instructions executable by the one or more processors, wherein the instructions, when executed, cause the system to perform acts comprising: providing simulation data to a control system for an autonomous vehicle, the simulation data causing the control system to simulate functioning of an autonomous vehicle and including simulated vehicle control data and simulated object control data, wherein: the simulated vehicle control data causes a first system of the control system to generate one or more first control signals for controlling a simulated autonomous vehicle along one or more trajectories in an environment, and the simulated object data causes a second system of the control system to determine a collision between the simulated autonomous vehicle controlled according to the one or more first control signals and a simulated object, the second system being configured to generate one or more second control signals for controlling the simulated autonomous vehicle in response to determining the collision; and receiving, from the control system, information about a response control signal of the one or more second control signals generated by the second system in response to the object data.

B: The system of example A, the acts further comprising: determining, based at least in part on the information about the response control signal and by the second system, a simulated vehicle response trajectory; determining, based at least in part on the object data, a simulated object trajectory; and determining, based at least in part on the simulated vehicle response trajectory and the simulated object trajectory, a simulated outcome.

C: The system of example A or example B, wherein: the object data is determined based at least in part on the vehicle control data such that the simulated autonomous vehicle will collide with the simulated object at a first time, and the first time is less than a second time for the first system to modify the one or more trajectories.

D: The system of any one of example A through example C, wherein the vehicle control data and the object data define a first scenario of a plurality of scenarios, a second scenario of the plurality of scenarios comprising at least one of a first variation of the vehicle control data or a second variation of the object data, the at least one of the first variation or the second variation selected based at least in part on a scenario threshold probability for the second scenario being equal to or below a threshold scenario probability.

E: The system of any one of example A through example D, the acts further comprising: determining, based at least in part on a first simulated outcome of the first scenario and a second simulated outcome of the second scenario, one or more operational limitations for an autonomous vehicle including the control system; and controlling the autonomous vehicle based at least in part on the operational limitations.

F: An example method comprising: determining a simulation scenario associated with autonomous vehicles, the simulation scenario comprising vehicle control parameters for simulating control of a simulated autonomous vehicle and simulated object information; sending the vehicle control parameters to a control system of the simulated autonomous vehicle, the control system including a first system configured to determine, based at least in part on the vehicle control parameters and presence of one or more objects, one or more first control signals for controlling the simulated autonomous vehicle to traverse along a first vehicle trajectory in accordance with the vehicle control parameters; sending the simulated object information to the control system, the control system including a second system configured to determine, based at least in part on the simulated object information, the presence of a simulated object impeding travel along the first vehicle trajectory, the second system further configured to generate one or more second control signals, in response to a determined collision of the vehicle and simulated object, for controlling the simulated autonomous vehicle to traverse along a response trajectory, responsive to the simulated object; receiving, from the control system, information about the one or more second control signals; and determining, based at least in part on the vehicle control parameters, the simulated object information, and the one or more second control signals, a simulated outcome.

G: The method of example F, wherein the determining the simulated outcome comprises: determining, based at least in part on the information about the response control signal, a simulated vehicle response trajectory; determining, based at least in part on the object information, a simulated object trajectory; and determining the simulated outcome based at least in part on the simulated vehicle response trajectory and the simulated object trajectory.

H: The method of example F or example G, wherein: the simulated object data is determined based at least in part on the vehicle control data such that the simulated autonomous vehicle will collide with the simulated object at a first time, and the first time is less than a second time for the first system to generate the first control signal responsive to the simulated object.

I: The method of any one of example F through example H, wherein the object information comprises simulated sensor data corresponding to sensor data generated by a sensor of the autonomous vehicle.

J: The method of any one of example F through example I, wherein the vehicle control parameters and the simulated object information are generated at least in part based on one or more of: the first vehicle trajectory comprising a vehicle speed equal to or within a threshold speed of a maximum speed of an autonomous vehicle; or the simulated object having an object trajectory having at least one of a direction substantially opposite to the first vehicle trajectory or an object speed equal to or within a threshold speed of a maximum speed of an object simulated by the simulated object.

K: The method of any one of example F through example J, wherein a first scenario of the plurality of scenarios comprises first vehicle control parameters and first object information and a second scenario of the plurality of scenarios comprises second vehicle control parameters and second object information, the method further comprising: determining, based at least in part on a first simulated outcome of the first scenario and a second simulated outcome of the second scenario, one or more operational parameters for an autonomous vehicle including the control system; and controlling the autonomous vehicle based at least in part on the operational parameters.

L: The method of any one of example F through example K, wherein: the first vehicle control parameters comprise at least one of a first vehicle acceleration, a first vehicle speed, a first vehicle travel path, or a first vehicle destination; the second vehicle control parameters comprise at least one of a second vehicle acceleration, a second vehicle speed, a second vehicle travel path, or a second vehicle destination; and the first vehicle control parameters and the second control parameters are based at least in part on dynamic functionality of the autonomous vehicle.

M: The method of any one of example F through example L, wherein: the first object information comprises at least one of a first position of the simulated object, a first velocity of the simulated object, a first travel path of the simulated object; or a first time at which the first object information is available to the second system; and the second object information comprises at least one of a second position of the simulated object, a second velocity of the simulated object, a second travel path of the simulated object, or a second time at which the second object information is available to the second system.

N: The method of any one of example F through example M, wherein the object information is based at least in part on a simulated object type, a first simulated object type having at least one of first extents, a first maximum speed, a first range of motion, or a first maximum acceleration and a second simulated object type having at least one of second extents, a second maximum speed, a second range of motion, or a second maximum acceleration, wherein the first simulated object type or the second simulated object type comprises at least one of a pedestrian, a bicyclist, or a vehicle.

O: The method of any one of example F through example N, wherein the determining the plurality of scenarios comprises: determining a parameter range associated with a first parameter of the vehicle control parameters, the parameter range being based at least in part on dynamics of the autonomous vehicle; generating a first scenario of the plurality of scenarios based at least in part on a first value of the first parameter in the parameter range; and generating a second scenario of the plurality of scenarios based at least in part on a second value of the first parameter range.

P: An example one or more non-transitory computer-readable media storing instructions that, when executed, cause one or more processors to perform operations comprising: determining a simulation scenario for testing a response of a simulated autonomous vehicle, the simulation scenario comprising: vehicle control data indicative of an initial state of the simulated autonomous vehicle, and object data comprising information about a simulated object to be instantiated in a simulated environment comprising the simulated autonomous vehicle; instantiating, at a first time, the simulated autonomous vehicle in the simulated environment based at least in part on the vehicle control data; determining, by a primary system of a control system associated with the simulated autonomous vehicle, a vehicle trajectory comprising one or more first controls; controlling the simulated autonomous vehicle to traverse the simulated environment according to the vehicle trajectory; sending, at a second time, the object data to the control system; determining, by a secondary system of the control system and based at least in part on the vehicle trajectory and the object data, a predicted collision; determining, by the secondary system and based at least in part on the predicted collision, one or more second controls responsive to the predicted collision; receiving, from the control system, information about the one or more first controls and about the one or more second controls; and determining, based at least in part on the first controls, the object data, and the second controls a simulated outcome.

Q: The one or more non-transitory computer-readable media of example P, wherein the object data comprises an object trajectory based at least in part on the vehicle control data and determined to cause the object to collide with the simulated autonomous vehicle, and wherein a time to collision between the simulated object and the simulated autonomous vehicle is less than an amount of time required by the primary system to modify the vehicle trajectory in response to the simulated object.

R: The one or more non-transitory computer-readable media of example P or example Q, wherein the simulated scenario is one of a plurality of simulated scenarios, individual of the plurality of simulated scenarios comprising at least one of a variation of the vehicle control data or a variation of the object data.

S: The one or more non-transitory computer-readable media of any one of example P through example R, wherein the simulated outcome comprises one of a simulated impact between the autonomous vehicle and the simulated object or a simulated avoidance of the simulated object by the autonomous vehicle.

T: The one or more non-transitory computer-readable media of any one of example P through example S, wherein the object data comprises one or more of simulated sensor data associated with the simulated object, a representation of the simulated object, or an object classification, and the object data further comprises at least one of a position of the simulated object, a velocity of the simulated object, or a travel path of the simulated object.

While the example clauses described above are described with respect to particular implementations, it should be understood that, in the context of this document, the content of the example clauses can be implemented via a method, device, system, a computer-readable medium, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
one or more computer-readable media storing instructions executable by the one or more processors, wherein the instructions, when executed, cause the system to perform acts comprising:
providing simulation data to a control system for an autonomous vehicle, the control system comprising a first system configured to generate first control signals at a first frequency and a second system configured to generate second control signals at a second frequency, the simulation data causing the control system to simulate functioning of an autonomous vehicle and including simulated vehicle control data and simulated object control data, wherein the providing the simulation data comprises:
  providing the simulated vehicle control data to the first system to cause the first system to generate a first control signal of the first control signals for controlling a simulated autonomous vehicle along a trajectory in a simulated environment, and
  providing the simulated object control data to the second system to cause the second system to determine a collision between the simulated autonomous vehicle controlled along the trajectory according to the first control signal and a simulated object, the second system being configured to generate a second control signal of the second control signals for controlling the simulated autonomous vehicle in response to determining the collision, the second control signal being generated prior to the first system generating a next first control signal of the first control signals at the first frequency; and
receiving, from the control system, information about a response control signal of the one or more second control signals generated by the second system in response to the simulated object control data.

2. The system of claim 1, the acts further comprising:
determining, based at least in part on the information about the response control signal and by the second system, a simulated vehicle response trajectory;
determining, based at least in part on the simulated object control data, a simulated object trajectory; and
determining, based at least in part on the simulated vehicle response trajectory and the simulated object trajectory, a simulated outcome.

3. The system of claim 1, wherein:
the first control signal is generated at a first time,
the next first control signal is to be generated at a second time based on the first frequency, and
the simulated object control data is determined based at least in part on the vehicle control data such that the simulated autonomous vehicle will collide with the simulated object at a third time between the first time and the second time.

4. The system of claim 1, wherein the vehicle control data and the simulated object control data define a first scenario of a plurality of scenarios, a second scenario of the plurality of scenarios comprising at least one of a first variation of the vehicle control data or a second variation of the simulated object control data, the at least one of the first variation or the second variation selected based at least in part on a scenario threshold probability for the second scenario being equal to or below a threshold scenario probability.

5. The system of claim 4, the acts further comprising:
determining, based at least in part on a first simulated outcome of the first scenario and a second simulated outcome of the second scenario, one or more operational limitations for an autonomous vehicle including the control system; and
controlling the autonomous vehicle based at least in part on the operational limitations.

6. A method comprising:
determining a simulation scenario associated with autonomous vehicles, the simulation scenario comprising vehicle control parameters for simulating control of a simulated autonomous vehicle and simulated object information, wherein the vehicle control parameters are based at least in part on dynamics of an autonomous vehicle to be simulated and the simulated object information is based at least in part on dynamics of an object to be simulated, and wherein the vehicle control parameters and the simulated object information cause an adversarial scenario that results in a collision of the simulated autonomous vehicle with a simulated object;
sending the vehicle control parameters to a control system of the simulated autonomous vehicle, the control system including a first system configured to determine, based at least in part on the vehicle control parameters, one or more first control signals for controlling the simulated autonomous vehicle to traverse along a first vehicle trajectory in accordance with the vehicle control parameters, wherein the first system generates the one or more first control signals at a first frequency;
sending the simulated object information to the control system, the control system including a second system configured to determine, based at least in part on the simulated object information and prior to the first system generating a next of the one or more first control signals, the presence of the simulated object impeding travel along the first vehicle trajectory, the second system further configured to generate one or more second control signals in response to a determined collision of the vehicle and the simulated object, for controlling the simulated autonomous vehicle to traverse along a response trajectory, responsive to the simulated object;
receiving, from the control system, information about the one or more second control signals; and
determining, based at least in part on the vehicle control parameters, the simulated object information, and the one or more second control signals, a simulated outcome.

7. The method of claim 6, wherein the determining the simulated outcome comprises:
determining, based at least in part on the information about a response control signal, a simulated vehicle response trajectory;
determining, based at least in part on the object information, a simulated object trajectory; and
determining the simulated outcome based at least in part on the simulated vehicle response trajectory and the simulated object trajectory.

8. The method of claim 7, wherein:
the simulated object information is determined based at least in part on the vehicle control parameters such that the simulated autonomous vehicle will collide with the simulated object at a first time, and
the first time is before a second time at which the first system generates a next of the one more first control signals, responsive to the simulated object.

9. The method of claim 6, wherein the object information comprises simulated sensor data corresponding to sensor data generated by a sensor of the autonomous vehicle.

10. The method of claim 6, wherein the vehicle control parameters and the simulated object information are generated at least in part based on one or more of:
the first vehicle trajectory comprising a vehicle speed equal to or within a threshold speed of a maximum speed of an autonomous vehicle; or
the simulated object having an object trajectory having at least one of a direction opposite to the first vehicle trajectory or an object speed equal to or within a threshold speed of a maximum speed of an object simulated by the simulated object.

11. The method of claim 6, wherein a first scenario of a plurality of scenarios comprises first vehicle control parameters and first object information and a second scenario of the plurality of scenarios comprises second vehicle control parameters and second object information, the method further comprising:
- determining, based at least in part on a first simulated outcome of the first scenario and a second simulated outcome of the second scenario, one or more operational parameters for an autonomous vehicle including the control system; and
- controlling the autonomous vehicle based at least in part on the operational parameters.

12. The method of claim 11, wherein:
- the first vehicle control parameters comprise at least one of a first vehicle acceleration, a first vehicle speed, a first vehicle travel path, or a first vehicle destination;
- the second vehicle control parameters comprise at least one of a second vehicle acceleration, a second vehicle speed, a second vehicle travel path, or a second vehicle destination; and
- the first vehicle control parameters and the second control parameters are based at least in part on dynamic functionality of the autonomous vehicle.

13. The method of claim 11, wherein:
- the first object information comprises at least one of a first position of the simulated object, a first velocity of the simulated object, a first travel path of the simulated object; or a first time at which the first object information is available to the second system; and
- the second object information comprises at least one of a second position of the simulated object, a second velocity of the simulated object, a second travel path of the simulated object, or a second time at which the second object information is available to the second system.

14. The method of claim 6, wherein the object information is based at least in part on a simulated object type, a first simulated object type having at least one of first extents, a first maximum speed, a first range of motion, or a first maximum acceleration and a second simulated object type having at least one of second extents, a second maximum speed, a second range of motion, or a second maximum acceleration, wherein the first simulated object type or the second simulated object type comprises at least one of a pedestrian, a bicyclist, or a vehicle.

15. The method of claim 6, wherein the determining a plurality of scenarios comprises:
- determining a parameter range associated with a first parameter of the vehicle control parameters, the parameter range being based at least in part on dynamics of the autonomous vehicle;
- generating a first scenario of the plurality of scenarios based at least in part on a first value of the first parameter in the parameter range; and
- generating a second scenario of the plurality of scenarios based at least in part on a second value of the first parameter range.

16. One or more non-transitory computer-readable media storing instructions that, when executed, cause one or more processors to perform operations comprising:
- determining a simulation scenario for testing a response of a simulated autonomous vehicle, the simulation scenario comprising:
  - vehicle control data indicative of an initial state of the simulated autonomous vehicle, and
  - object data comprising information about a simulated object to be instantiated in a simulated environment comprising the simulated autonomous vehicle,
  - wherein the vehicle control data and the object data are configured to cause an adversarial scenario that results in a collision of the simulated autonomous vehicle with the simulated object;
- instantiating, at a first time, the simulated autonomous vehicle in the simulated environment based at least in part on the vehicle control data;
- determining, by a primary system of a control system associated with the simulated autonomous vehicle, a vehicle trajectory comprising one or more first controls, the primary system being configured to determine the vehicle trajectories, including the vehicle trajectory at a first frequency;
- controlling the simulated autonomous vehicle to traverse the simulated environment according to the vehicle trajectory;
- sending, at a second time, the object data to the control system;
- determining, by a secondary system of the control system, based at least in part on the vehicle trajectory and the object data, and prior to the primary system determining a next vehicle trajectory in accordance with the first frequency, a predicted collision;
- determining, by the secondary system and based at least in part on the predicted collision, one or more second controls responsive to the predicted collision;
- receiving, from the control system, information about the one or more first controls and about the one or more second controls; and
- determining, based at least in part on the first controls, the object data, and the second controls a simulated outcome.

17. The one or more non-transitory computer-readable media of claim 16,
- wherein the object data comprises an object trajectory based at least in part on the vehicle control data and determined to cause the object to collide with the simulated autonomous vehicle, and
- wherein a time to collision between the simulated object and the simulated autonomous vehicle is less than an amount of time required by the primary system to modify the vehicle trajectory in response to the simulated object.

18. The one or more non-transitory computer-readable media of claim 16, wherein the simulated scenario is one of a plurality of simulated scenarios, individual of the plurality of simulated scenarios comprising at least one of a variation of the vehicle control data or a variation of the object data.

19. The one or more non-transitory computer-readable media of claim 16, wherein the simulated outcome comprises one of a simulated impact between the autonomous vehicle and the simulated object or a simulated avoidance of the simulated object by the autonomous vehicle.

20. The one or more non-transitory computer-readable media of claim 16, wherein the object data comprises one or more of simulated sensor data associated with the simulated object, a representation of the simulated object, or an object classification, and the object data further comprises at least one of a position of the simulated object, a velocity of the simulated object, or a travel path of the simulated object.

* * * * *